(12) United States Patent
Sarkar et al.

(10) Patent No.: US 10,621,506 B2
(45) Date of Patent: Apr. 14, 2020

(54) APPARATUS AND METHOD FOR ACTIVITY DETECTION AND CLASSIFICATION FROM SENSOR DATA

(71) Applicant: U.S. Army Research Laboratory, Adelphi, MD (US)

(72) Inventors: Soumalya Sarkar, Manchester, CT (US); Thyagaraju Damarla, Laurel, MD (US); Asok Ray, State College, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 993 days.

(21) Appl. No.: 14/928,831

(22) Filed: Oct. 30, 2015

(65) Prior Publication Data

US 2017/0124480 A1    May 4, 2017

(51) Int. Cl.
  *G06N 20/00* (2019.01)
  *G06N 7/00* (2006.01)
  *G01V 1/00* (2006.01)

(52) U.S. Cl.
  CPC .......... *G06N 20/00* (2019.01); *G01V 1/001* (2013.01); *G06N 7/005* (2013.01)

(58) Field of Classification Search
  None
  See application file for complete search history.

(56) References Cited

U.S. PATENT DOCUMENTS

| | | |
|---|---|---|
| 6,272,479 B1 * | 8/2001 | Farry ............... A61N 1/08 700/213 |
| 7,656,288 B2 | 2/2010 | Joslin et al. |
| 7,710,264 B2 | 5/2010 | Voglewede et al. |
| 7,710,265 B2 | 5/2010 | Voglewede et al. |
| 7,714,714 B2 | 5/2010 | Voglewede et al. |

(Continued)

OTHER PUBLICATIONS

Xin, Jin, "Target Detection and Classification Using Seismic and PIR Sensors," IEEE Sensors Journal, vol. 12, No. 6, Jun. 2012, pp. 1709-1718.

(Continued)

*Primary Examiner* — Alan Chen
(74) *Attorney, Agent, or Firm* — Alan I. Kalb

(57) ABSTRACT

A system for detection of human or vehicle activity comprising at least one sensor adapted to generate a signal and at least one processor operating to denoise the signal; generate an autocorrelation of the signal; partition the signal into a predetermined number of overlapping segments to form a time series of data; generate symbols for the overlapping segments; compare the pattern of generated symbols with known predetermined patterns of symbols representing human or vehicular activity; determine whether a threshold probability is exceeded which attributes the data signal to human or vehicular activity; analyze the patterns presented in the data signal by transforming the patterns of symbols into states; determine the transitions between states; and classify the signal as to being attributable to human or vehicular activity based upon the transitions between states. A method of detection and classification of sensor data signals via detecting patterns using time series analysis.

9 Claims, 14 Drawing Sheets

(56) References Cited

U.S. PATENT DOCUMENTS

| | | | | |
|---|---|---|---|---|
| 8,331,195 | B1* | 12/2012 | Schumer | G01P 13/00 |
| | | | | 340/566 |
| 9,851,461 | B1* | 12/2017 | Ainsleigh | G01V 1/001 |
| 2008/0109091 | A1 | 5/2008 | Joslin et al. | |
| 2008/0309482 | A1 | 12/2008 | Asplund et al. | |
| 2015/0347902 | A1* | 12/2015 | Butler, Jr. | G06N 5/022 |
| | | | | 706/46 |
| 2015/0371638 | A1* | 12/2015 | Ma | G10L 15/065 |
| | | | | 704/275 |
| 2016/0191163 | A1* | 6/2016 | Preston | G01B 11/161 |
| | | | | 398/16 |
| 2017/0061969 | A1* | 3/2017 | Thornburg | G10L 25/51 |

OTHER PUBLICATIONS

Sarkar, Soumalya "Real-time Activity Recognition from Seismic Signature via Multi-scale Symbolic Time Series Analysis (MSTSA)" 2015 American Control Conference Palmer House Hilton Jul. 1-3, 2015. Chicago, IL, USA.

K. Houston and D. McGaffigan, "Spectrum analysis techniques for personnel detection using seismic sensors," in Unattended Ground Sensor Technologies & Applications V, vol. 5090, pp. 162-173, SPIE, 2003.

A. Ray, "Symbolic dynamic analysis of complex systems for anomaly detection," Sig. Process., vol. 84, No. 7, pp. 1115-1130, 2004.

S. Sarkar, K. Mukherjee, S. Sarkar, and A. Ray, "Symbolic dynamic analysis of transient time series for fault detection in gas turbine engines," ASME Journal of Dynamic Systems, Measurement and Control, vol. 135, pp. 14506-1-14506-6, Jan. 2013.

Y. Wen, K. Mukherjee, and A. Ray, "Adaptive pattern classification for symbolic dynamic systems," Signal Processing, vol. 93, pp. 252-260, Jan. 2013.

Subbu and A. Ray, "Space partitioning via hilbert transform for symbolic time series analysis," Applied Physics Letters, vol. 92, No. 8, pp. 084107-1 to 084107-3, Feb. 2008.

S. Bahrampour, A. Ray, S. Sarkar, T. Damarla, and N. M. Nasrabadi, "Performance comparison of feature extraction algorithms for target detection and classification," Pattern Recognition Letters, vol. 34, pp. 2126-2134, Dec. 2013.

Kushal Mukherjee, et al. "State splitting and merging in probabilisti State splitting and merging in probabilistic finite state automata for signal representation and analysis," Signal Processing 104(2014)105-119.

* cited by examiner

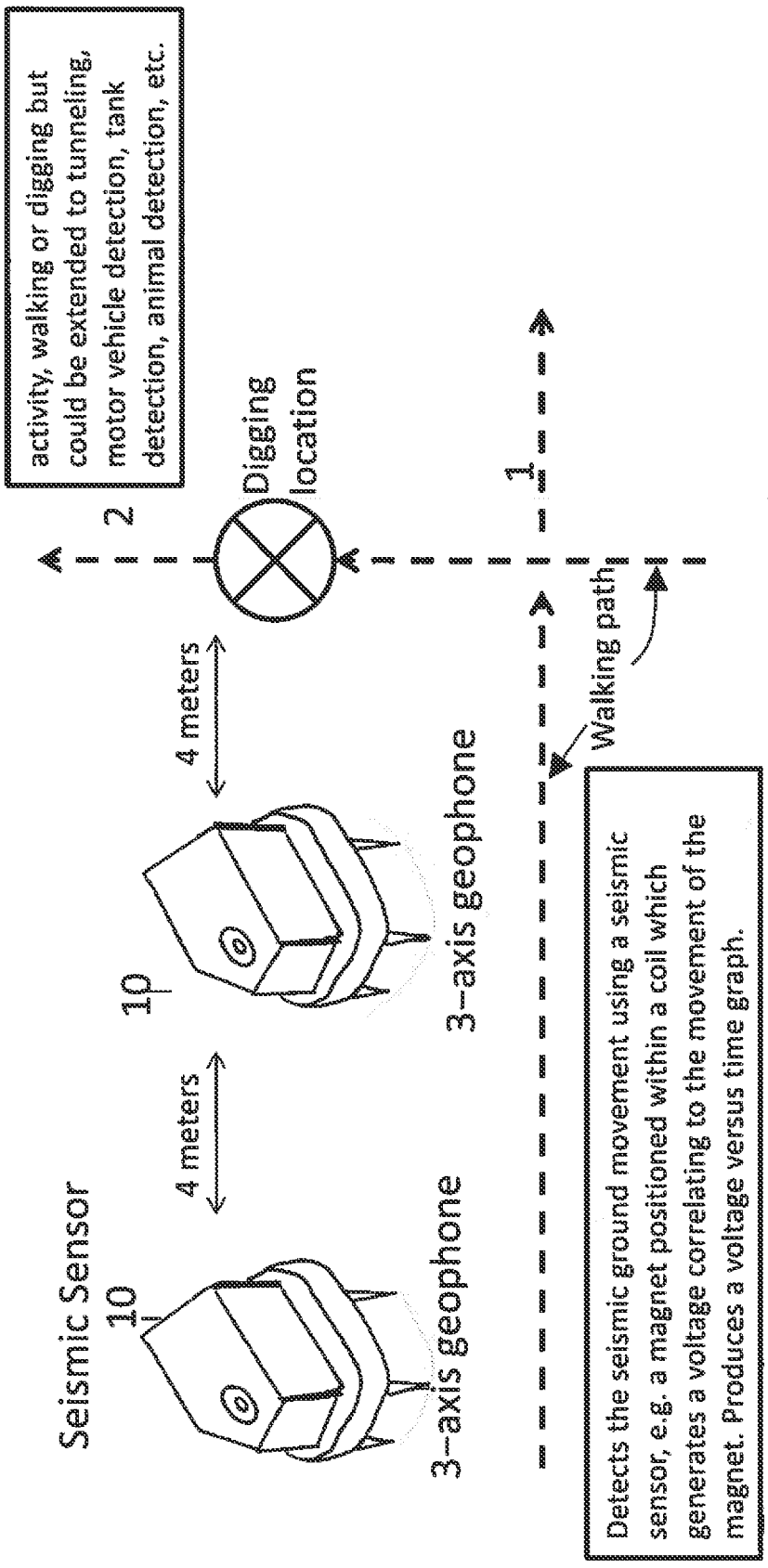
FIG. 1B Experimental Setup for monitoring and data collection

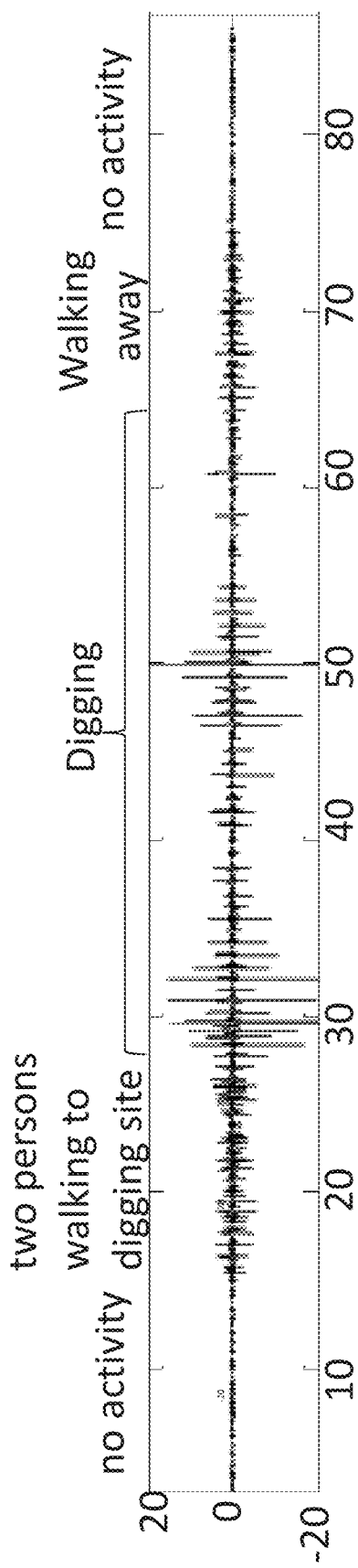
FIG. 2A  The seismic signal generates a voltage versus time graph.

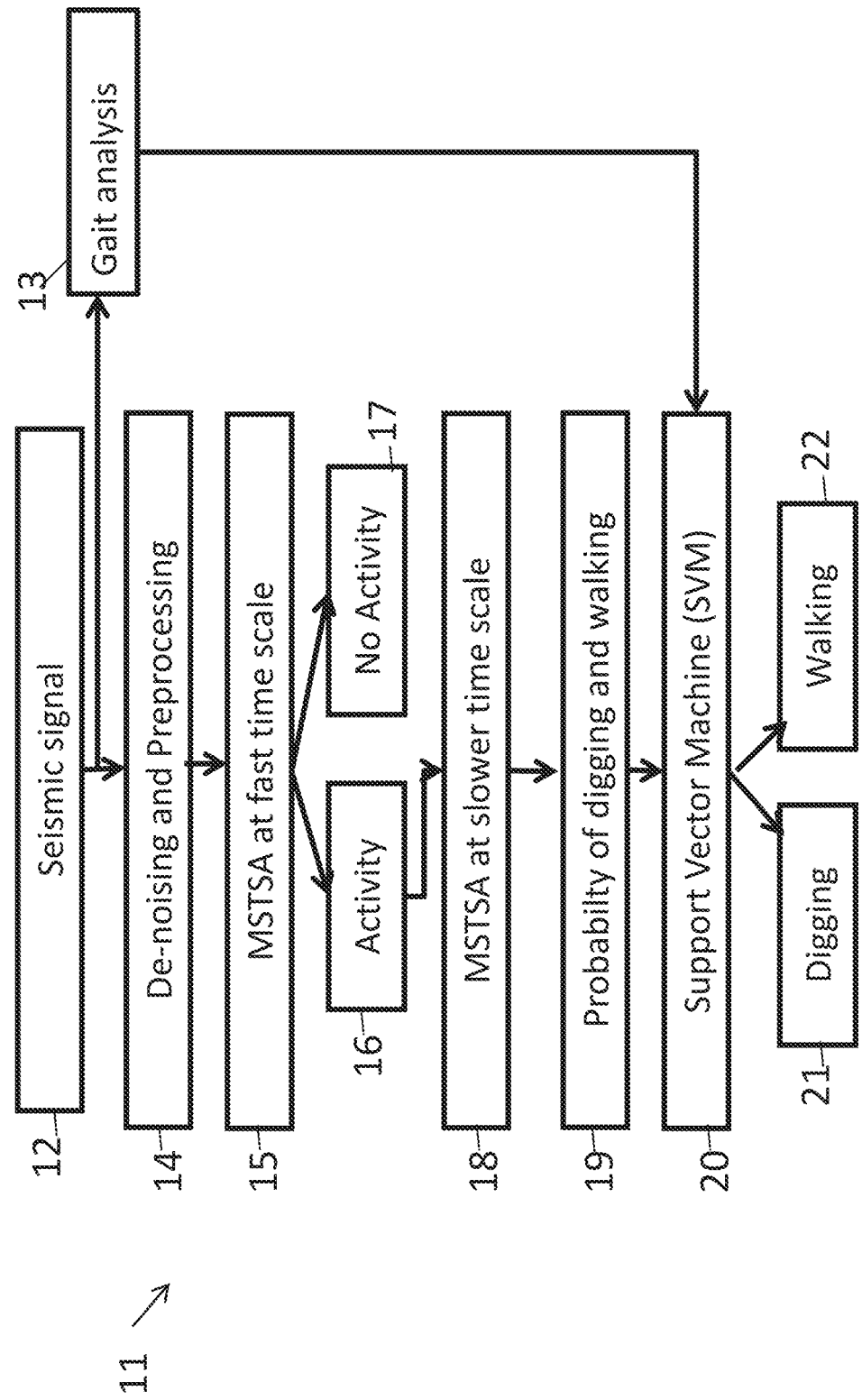
FIG. 2B Activity Detection using bi-layer classification by MSTSA
Detection of Activity portion Using the Multi-scales Symbolic Time Series Algorithm (MSTSA).

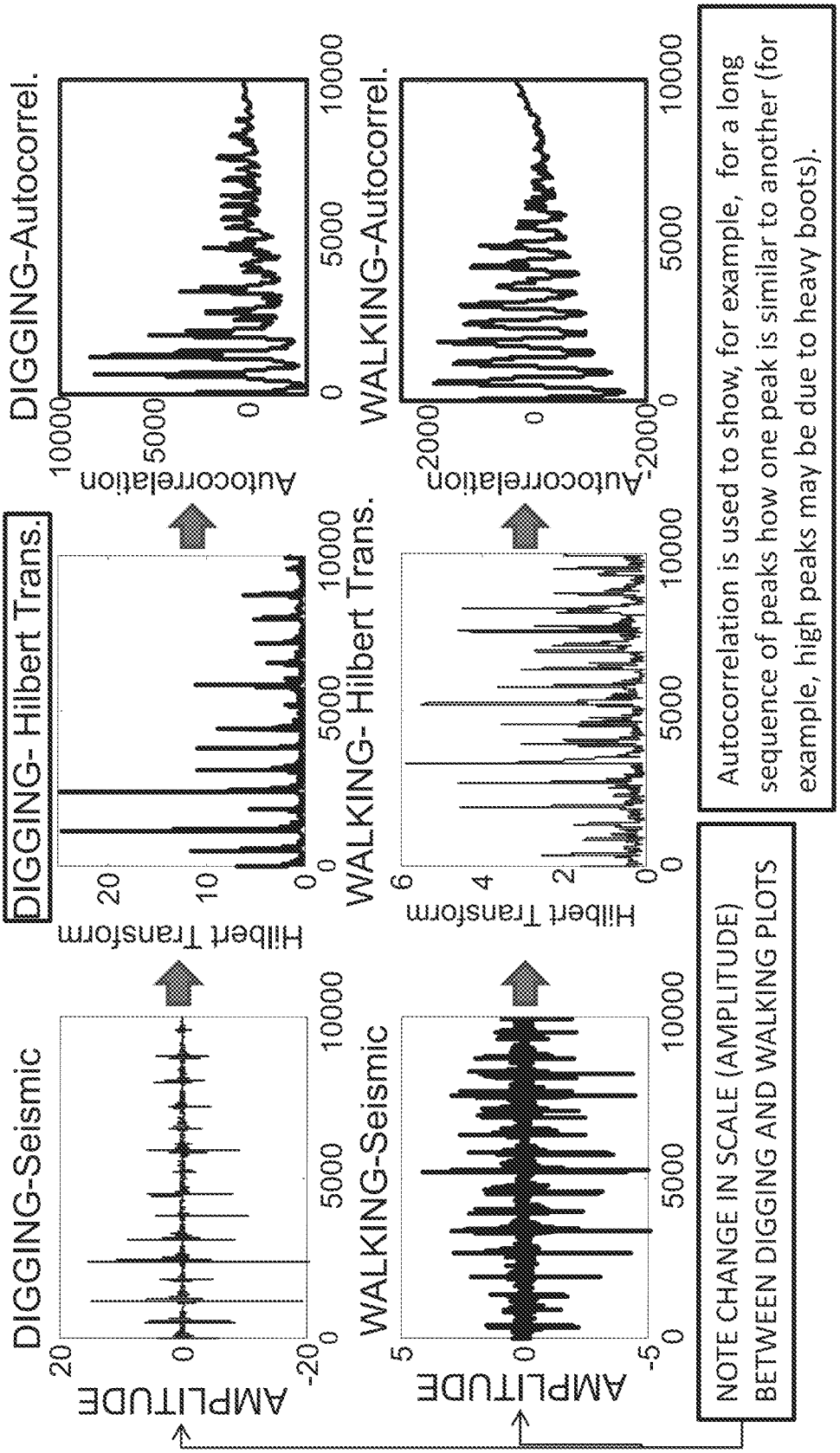

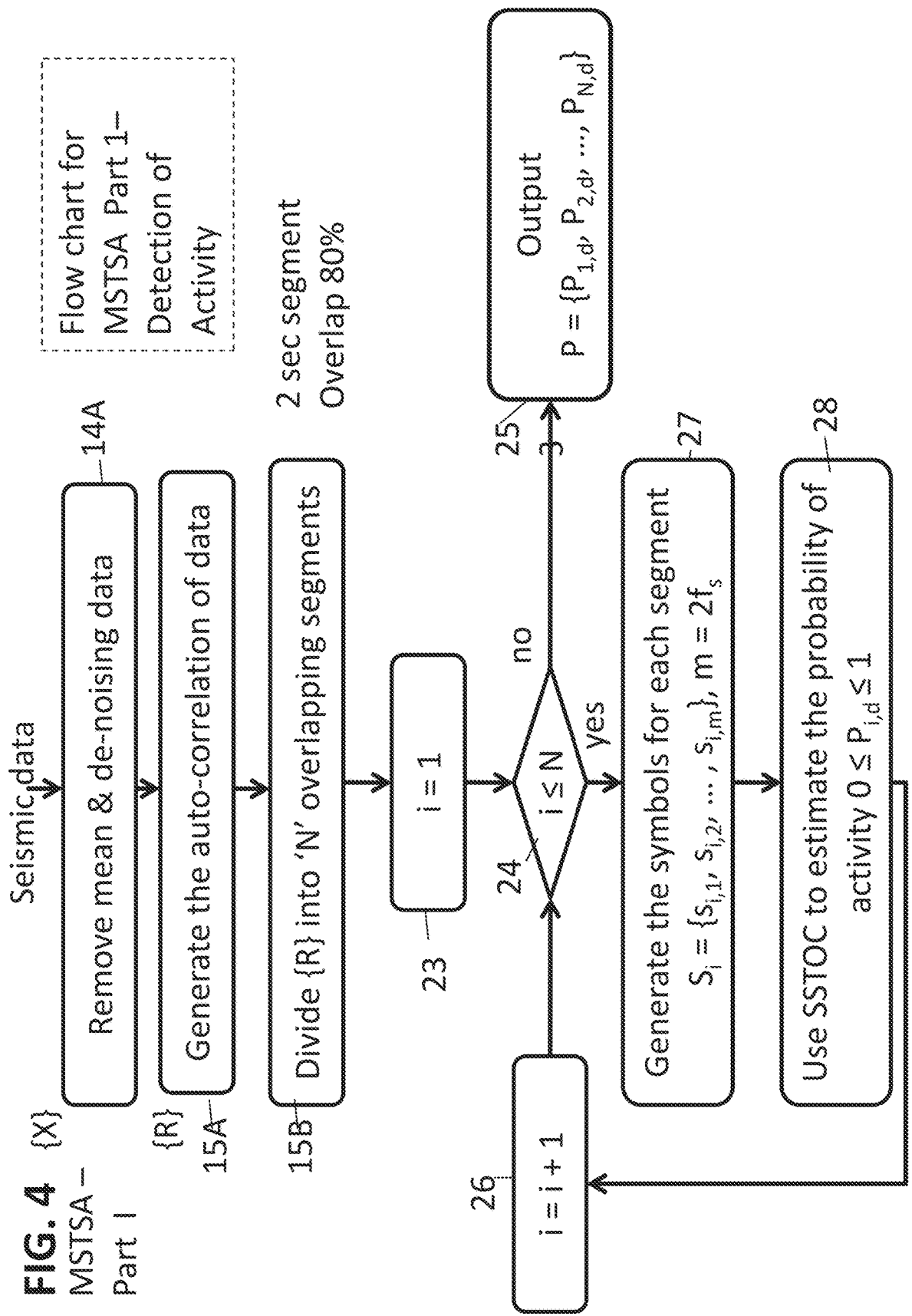
FIG. 4 MSTSA – Part I

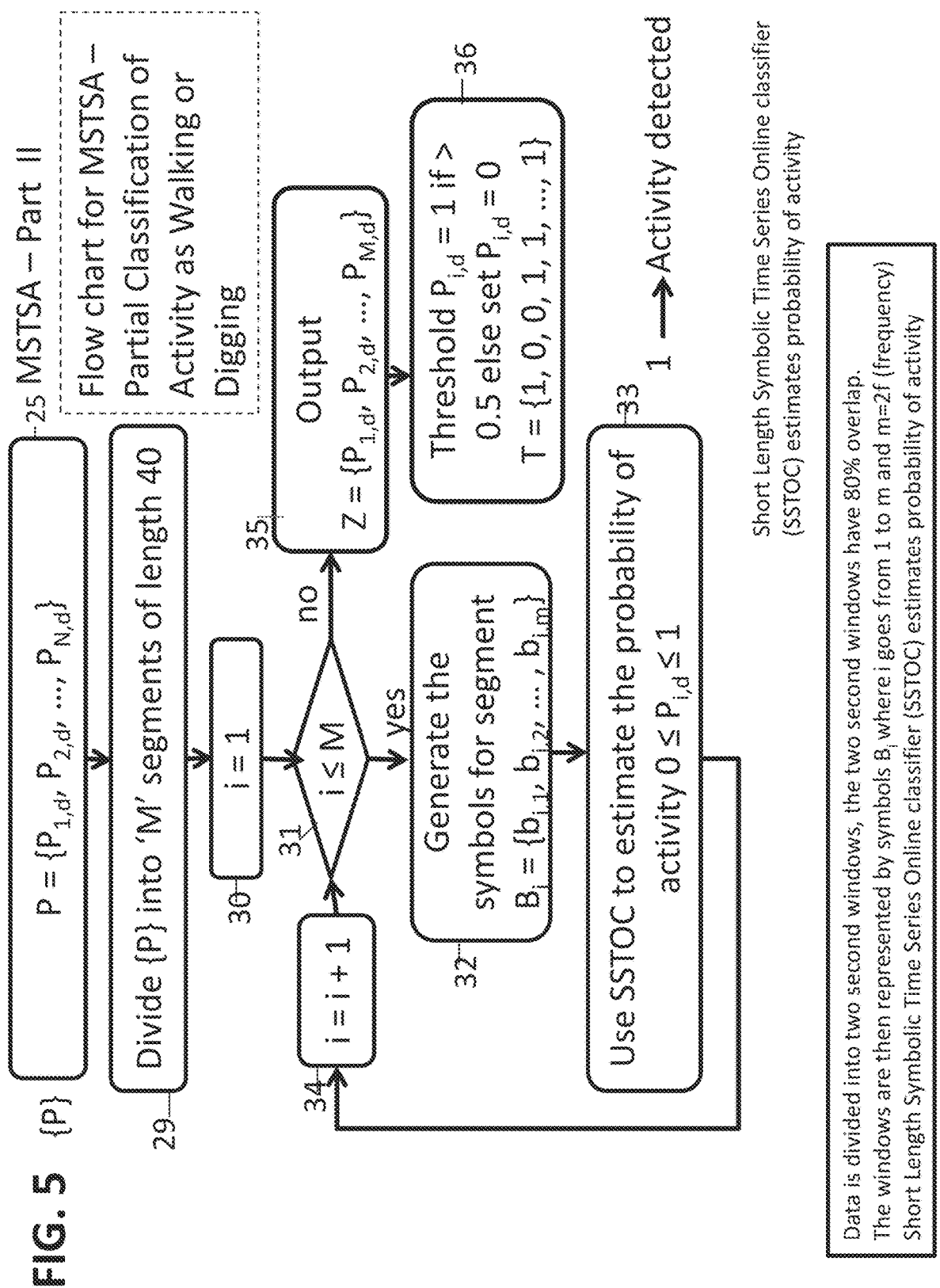

Classification

APPARATUS AND METHOD FOR ACTIVITY DETECTION AND CLASSIFICATION FROM SENSOR DATA

STATEMENT OF GOVERNMENT INTEREST

The embodiments herein may be manufactured, used, and/or licensed by or for the U.S. Government without the payment of royalties thereon.

BACKGROUND OF THE INVENTION

Reliability of unattended ground sensors (UGS) to detect and classify different activities (e.g., walking and digging) is often limited by high false alarm rates, possibly due to the lack of robustness of the underlying algorithms in different environmental conditions (e.g., soil types and moisture contents for seismic sensors), inability to model large variations in the signature of a single activity and limitations of on-board computation. Tactical scenarios, pertinent to border control and surveillance, are richly equipped with multi-modal sensing devices (e.g., acoustic, seismic, passive infrared, and magnetic), referred to as unattended ground sensors (UGS). Such systems are deployed to detect and classify different types of targets and activities in real time, which requires a holistic situation awareness. Despite the high false alarm rates, the UGS systems are preferred because they are relatively inexpensive, easy to deploy and unobtrusive to the surroundings. The high false alarm rates may be attributed to inadequate on-board processing algorithms and the lack of robustness of the detection algorithms in different environmental conditions (e.g., soil types and moisture contents for seismic sensors). Furthermore, limited battery operating life have made power consumption a critical concern for both sensing and information communication.

Seismic sensors have performed with the highest reliability compared to other components of UGS systems regarding target detection and activity classification because they are less sensitive to Doppler effects and environment variations as compared to acoustic sensors. Present personnel detection methods using seismic signals may be classified into three categories, namely, time domain methods, frequency domain methods, and time-frequency domain methods. More recently, feature extraction from (wavelet-transformed) time series, based on symbolic dynamic filtering (SDF), has been proposed by X. Jin, S. Sarkar, A. Ray, S. Gupta, and T. Damarla, "Target detection and classification using seismic and PIR sensors," IEEE Sensors Journal, vol. 12, pp. 1709-1718, June 2012 (herein incorporated by reference) for target detection and classification in border regions. The rationale for using wavelet-based methods is denoising and time-frequency localization of the underlying sensor time series. However, this method requires tedious selection and tuning of several parameters (e.g., wavelet basis function and scales) for signal pre-processing in addition to the size of the symbol alphabet that is needed for SDF. In S. Bahrampour, A. Ray, S. Sarkar, T. Damarla, and N. M. Nasrabadi, "Performance comparison of feature extraction algorithms for target detection and classification," Pattern Recognition Letters, vol. 34, pp. 2126-2134, (December 2013) (herein incorporated by reference), a comparison shows consistently superior performance of SDF-based feature extraction over Cepstrum-based and PCA-based feature extraction, in terms of successful detection, false alarm, and misclassification rates, using data collected for border-crossing detection. The reliability of the performance by SDF, in varied environmental conditions for personnel detection problem, was studied in N. Virani, S. Marcks, S. Sarkar, K. Mukherjee, A. Ray, and S. Phoha, "Dynamic data driven sensor array fusion for target detection and classification," Procedia Computer Science, vol. 18, pp. 2046-2055 (December 2013), herein incorporated by reference.

There has been numerous research on human activity recognition from data collected by wearable sensors (e.g., accelerometer), ubiquitous sensor net (e.g., passive infrared (PIR) sensor net), imaging and video sensors (e.g., wireless camera network). However, there has been relatively little work done in activity recognition based on the data collected by UGS, especially seismic sensor. The main challenge lies in the inherent multi-timescale nature, low SNR and high variability (different external conditions) of the seismic data for same class of activity.

It appears that there has been relatively little work done in activity recognition based on the data collected by UGS, especially seismic sensors. The present invention is directed to a system designed to detect and classify different human activities from seismic signatures in real time. One of the most significant and dreaded threat scenarios in tactical situations is comprised of the activities such as, a personnel walking to a site and digging there to bury explosives and walking away. It is challenging to detect and segment such activities from only seismic signatures in real time because of their inherent multi-timescale nature with low signal-to-noise-ratio (SNR) in varied environmental conditions. Also, the persistence level and type of digging activity have a significant variability, which make the problem more complex. In seismic signals, both of these activities may appear as arrays of near-identical impulses at a fast time scale. But, it is the time evolution of those impulses in a slower time scale, which capture the separability of those activities.

There are several techniques proposed in the literature to determine gait of a person and classify whether the observed signature belongs to a human or an animal. In K. Houston and D. McGaffigan, "Spectrum analysis techniques for personnel detection using seismic sensors," in Unattended Ground Sensor Technologies & Applications V, vol. 5090, pp. 162-173, SPIE (2003), the seismic signatures are analyzed in Fourier domain to look for the fundamental and harmonics of gait frequency. Since the gait of a person walking is different from that of a quadruped, the fundamental and harmonics frequencies for a person walking are different from those of a quadruped and thereby distinguishing a person or a quadruped walking. In H. Park, et al., "Cadence analysis of temporal gait patterns for seismic discrimination between human and quadruped footsteps," in IEEE Conference on Acoustics, Speech and Signal Processing, pp. 1749-1752, (2009), the cadence analysis is done to extract temporal gait pattern which provides information on temporal distribution of the gait beats. However, these techniques result in a high number of false alarms or miss classification resulting in wasting human resources for investigation. Moreover, these techniques may or may not work in different soil conditions as the propagation properties of various soils are different, rendering the spectral based analysis prone to misdiagnosis. The reliability of the detection performance by SDF, in significantly varied environmental conditions for personnel detection problem, was studied in N. Virani, S. Marcks, S. Sarkar, K. Mukherjee, A. Ray, and S. Phoha, "Dynamic data driven sensor array fusion for target detection and classification," Procedia Computer Science, vol. 18, pp. 2046-2055 (December 2013).

In U.S. Published Application No. 2008/0309482 ('482), Honeywell Corp. implemented a tunnel activity detection. In the '482 patent application, several seismic sensors are deployed in the area of interest. If there is an underground activity, the sensors record the changes in the voltages and transmit them to a "tower" (paragraph [0036]), where it appears that a person determines if there is some activity in the ground by observing the changes in the voltage levels.

U.S. Pat. No. 7,656,288 to Joslin uses multiple sensors of different modalities to detect and classify an event. The event could be a person walking, vehicle traveling, etc.

In U.S. Published Application No. 2008/0109091 to Joslin, discloses a method for improved data communication with a remote sensor and communicating the data when a rule is satisfied. U.S. Pat. No. 7,714,714 to Volgewede, et al., discloses a system for improved signal processing using a remote sensor comprising a detection component and a classification component. The classification of an event is based at least in part on a situation. U.S. Pat. No. 7,710,265 to Volgewede, et al., discloses multiple sensors of different modalities to detect and classify an event such as a pedestrian walking, vehicle moving, etc., based on a set of rules and the rules are selected based at least in part on a situation.

SUMMARY OF THE INVENTION

A preferred embodiment system for detection of at least one of human activity and vehicle activity comprises:
  at least one sensor adapted to generate a data signal in response to detecting human or vehicular activity;
  at least one processor operatively connected to the sensor, the at least one processor operating to perform an analysis of the signal without human intervention in order to recognize and classify the type of activity detected by the sensor;
  the at least one processor being configured to denoise the data signal from the sensor; generate an autocorrelation of the data signal; partition the data signal into a predetermined number of overlapping segments to form a time series of data; generate symbols for the overlapping segments; compare the pattern of generated symbols with known patterns of symbols representing human or vehicular activity; determine whether a threshold probability is exceeded which attributes the data signal to human or vehicular activity; analyze the patterns presented in the data signal by transforming the patterns of symbols into states and determining the transitions between states; and classify the activity based upon the transitions between states A preferred method for detection and classification of human or vehicular activity using a sensor and at least one processor comprises the following steps not necessarily in the following order:
  sensing activity using a seismic sensor; the sensor being operatively connected to at least one processor and providing a seismic data signal extending for a predetermined time frame;
  denoising the data signal from the sensor and removal of the mean from the data signal;
  generating an autocorrelation of the data signal;'
  partitioning data signal into a predetermined number of overlapping segments to form a time series of data;
  generating symbols for the overlapping segments;
  comparing the pattern of generated symbols with known predetermined patterns of symbols representing human or vehicular activity;
  determining the probability of whether or not the seismic data signal is attributable to human activity;
  determining whether or not the probability determination meets or exceeds a predetermined threshold;
  recognizing the data signal as being possibly attributable to an activity when the threshold is met or exceeded;
  accumulating additional time frames of data signals repeating the steps of denoising, autocorrelation, partitioning the data signal into a predetermined number of overlapping segments and generating symbols for overlapping segments;
  transforming the generated symbols representing the initial and additional time frames into states and determining the transitions between states;
  based upon the transitions, determining whether or not a human or vehicular activity has occurred and classifying the activity based upon the transitions between states.

Although the invention is not limited to a specific algorithm, the invention may be practiced utilizing, inter alia, a fast and robust multi-scale symbolic time series analysis (MSTSA) framework for activity recognition from seismic signature. A building block of the proposed framework is built upon the concept of applying the short-length symbolic time-series online classifier (SSTOC) via Dirichlet-Compound-Multinomial model (DCM) construction. It is operated on symbol sequences generated from seismic time-series and intermediate event class time-series at different time-scales. The development of SSTOC was initiated by the authors in S. Sarkar, K. Mukherjee, S. Sarkar, and A. Ray, "Symbolic dynamic analysis of transient time series for fault detection in gas turbine engines," ASME Journal of Dynamic Systems, Measurement and Control, vol. 135, pp. 14506-1 to 14506-6, January 2013, and Y. Wen, K. Mukherjee, and A. Ray, "Adaptive pattern classification for symbolic dynamic systems," Signal Processing, vol. 93, pp. 252-260, (January 2013) both of which are herein incorporated by reference) to analyze short length transient data in SDF architecture. These building blocks, with different window sizes, are cascaded in multiple layers for activity detection and classification. The algorithm operates on symbol sequences that are generated from seismic time-series and intermediate event class time-series at different time scales. These building blocks, with different window sizes, are cascaded in multiple layers for event detection and activity classification. A variety of experiments have been conducted in the field, which include realistic scenarios of different types of walking/digging. The results of experiments show that an accuracy of more than 90% and a false alarm of around 5% can be achieved in real time for activity detection and recognition.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1B is a schematic illustration describing an alternate embodiment for data collection. Shown are two 3-axis geophones deployed as seismic sensors at distances of 4 m and 8 m from the site of digging. A typical run of the data collection is 90 s long and it comprises the activities such as walking to the site of digging, digging at the site, walking away from the site in order. It also has certain segments, before and after the activities, where there is no activity happening around the sensor.

FIG. 2A is an illustration showing the seismic signal generated as a voltage versus time graph. FIG. 2A is an example of a typical seismic time-series collected at the z-axis by a 3-axis geophone in the experiment; ground truth: no activity at $0 \leq t \leq 15$ s, two persons walking to digging site at $15 \leq t \leq 27.5$ s, digging at $27.5 \leq t \leq 63$ s, walking away at $63 \leq t \leq 76.5$ s and no activity at $76.5 \leq t \leq 90$ s.

FIG. 2B is a flow chart of an activity detector (AD) of a preferred embodiment of the invention. Activity Detection uses bi-layer classification by Multi-scale Symbolic Time Series Algorithm (MSTSA).

FIG. 3 is an illustration showing a comparison between digging (top charts) and walking (bottom charts) showing (left) seismic signal versus time, (middle) Hilbert transform of the signal and (right) autocorrelation of the signal. The data preprocessing steps for walking and digging are illustrated over 10 s window (sampling rate=1 kHz).

FIG. 4 is a flow chart for the illustration of a section of the Multi-scale Symbolic Time Series Algorithm.

FIG. 5 is a flow chart for the illustration of another section of the Multi-scale Symbolic Time Series Algorithm for partial classification of activity as walking or digging

FIG. 12 shows a typical seismic signal spanning 90 s, the final probability of activity posterior for detection and decision vector regarding activity classification with corresponding ground truth.

Figure 1A:
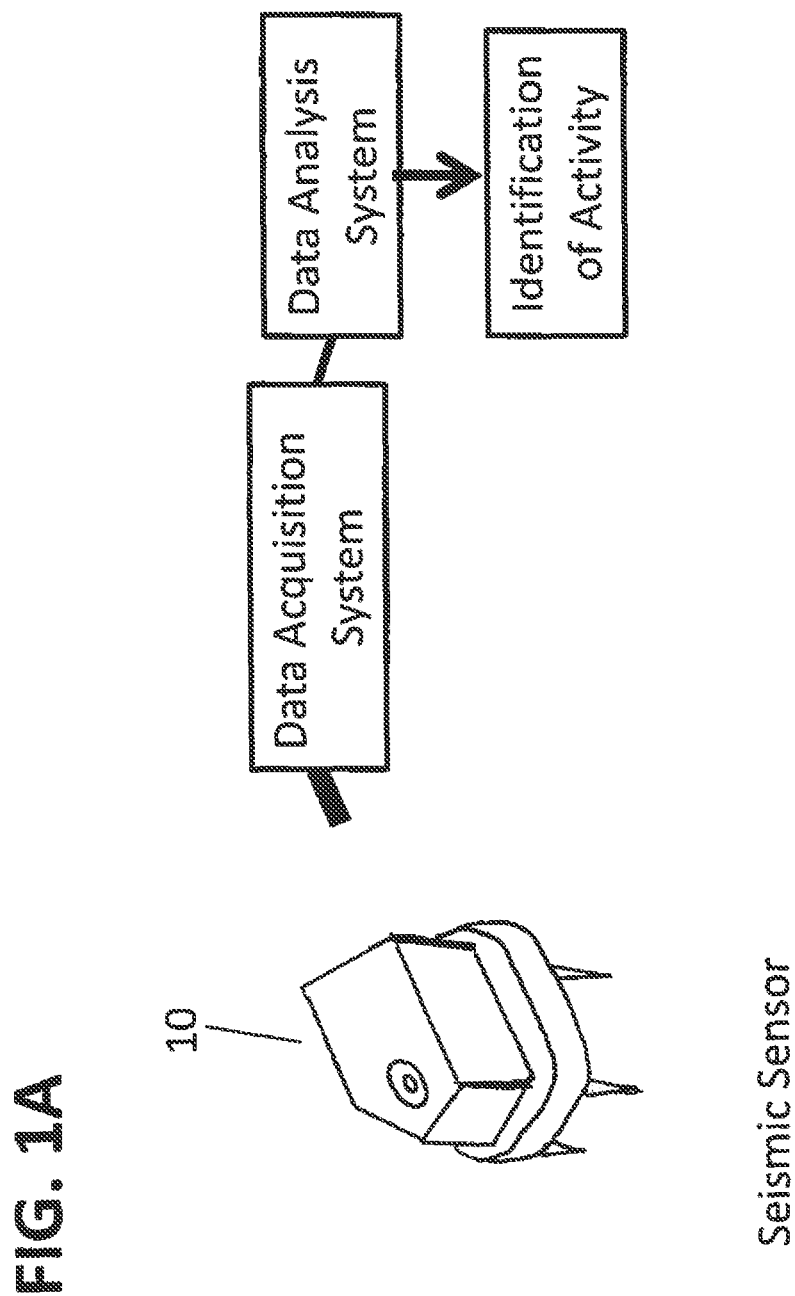
FIG. 1A is an illustration of a preferred embodiment comprising a sensor and blocks representing the data acquisition subsystem and data analysis subsystem that may be deployed to detect activity.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that when an element is referred to as being "connected" or "coupled" to another element, or "operatively connected" it can be directly connected or coupled to the other element or intervening elements may be present; or it may be connected, inter alia, by a wireless connection. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Unattended ground station (UGS) systems are relatively inexpensive, easy to deploy and unobtrusive to the surroundings. US Army routinely deploys UGS systems to detect nefarious activity near a culvert where miscreants may dig a hole to place an improvised explosive device (IED).

Overview

A central concept of the present invention is to represent the data recorded by a sensor in a form understood by a computer so that the data may be interpreted without human intervention. The data from the sensor(s) is broken into many, many segments or time intervals and then the changes in states (intensity levels) are analyzed. The invention detects no activity, walking or digging and could be extended to tunneling, motor vehicle detection, tank detection, animal detection, etc. A preferred embodiment of the present invention detects the seismic ground movement using a seismic sensor, an example of which is a magnet positioned within a coil which generates a voltage correlating to the movement of the magnet. The seismic signal generates a voltage versus time graph. A Multi-scale Symbolic Time Series Algorithm (MSTSA) performs two functions (1) detection of activity and (2) partial classification of the activity. Mean of the noise is removed from the voltage signal. An autocorrelation is performed in which long sequence of peaks are inputted and the autocorrelation determines how one peak is similar to another (for example, high peaks may be due to heavy boots). Subsequently, the data is divided into two-second windows that have 80% overlap. The windows are then represented by symbols of i where i goes from 1 to m and m=2f (frequency). A Short Length Symbolic Time Series Online classifier (SSTOC) estimates probability of activity. The partial classification portion of the Multi-scale Symbolic Time Series Algorithm (MSTSA) comprises a division of the probabilities P into 40 segments (from 1 to M where M=40) to output $P_{id}$ (threshold is denominated as $P_{id}$). Symbols $B_i$ are generated for the segment and the SSTOC (short term symbolic time-series online classifier) is used. The first 40 probabilities are looked at, then the window is shifted to probabilities from 10 to 50 to capture the next 40 probabilities; in order to capture variations. If probability is 1, activity is detected.

A preferred embodiment next uses Probabilistic Finite State Automaton (PFSA) Construction. The symbolic sequence is modeled as a probabilistic finite state automaton (PFSA). The data is constructed as a tuple $G=(Q,\Sigma,\zeta,\Pi)$, where the alphabet $\Sigma$ is a nonempty finite set of symbols ($\alpha$, $\beta$, $\gamma$, and $\delta$) and the set of states Q is constrained to be nonempty and finite. In other words, the data is converted to a series of symbols where Q is the state, $\Sigma$ is the symbols representing the arcs in FIG. 7 which are labeled $\alpha$, $\beta$, $\gamma$, and $\delta$, the state transition function $\zeta:Q\times\Sigma\rightarrow Q$ yields the new state, and $\pi$ is the probability, i.e., how many times a function has occurred, which has the matrix representation $\Pi$.

Figure Description

Referring now to FIG. 1A, a sensor 10, which may be a component of a preferred embodiment system, is utilized to detect activity. The component of the preferred embodiment system comprises a sensor 10 or a sensor suite of multiple modalities, a data acquisition system (that is, a system that takes the analog data from the sensors and converts into digital data that can be processed using digital computers) and a data analysis system which is a dedicated computer that analyzes the data and determines the type of activity. FIG. 1B illustrates an alternate preferred embodiment comprising two sensors 10. Each sensor 10 may be, for example, a seismic sensor such as a 3-axis geophone. FIG. 1B further shows a spacing of four meters between sensors 10 and a distance of four meters to a digging sight, arranged for testing the alternate preferred embodiment system. A typical run of data is 90 seconds long and comprises activities such as walking to the sight of digging, digging at the sight, walking away from the site. It also has certain segments (such as before and after the walking) where there is no activity happening. FIG. 2A is an example of such a data collection. FIG. 2A is an illustration of a scan produced by a seismic sensor showing amplitude (vertical axis) versus time (horizontal axis). The dashed lines in FIG. 1B show the walking paths.

FIG. 2B is a flow chart of an activity detector (AD) portion of a preferred embodiment of the invention. FIG. 2B illustrates the individual blocks or subparts of a preferred embodiment subsystem 11 and their implementation. In box 12, the signal, which may be seismic, is inputted in the computer processing system. In box 13, the signal is analyzed to determine a gait for the signal. In box 14, the processor completes de-noising and preprocessing of the inputted signal. Initially, the seismic time series is converted to a zero mean signal and down-sampled to 1 kHz from 4 kHz. Then, the seismic signal is de-noised via wavelet de-noising method (such as SureShrink thresholding as disclosed in D. L. Donoho and I. M. Johnstone, "Adapting to unknown smoothness via wavelet shrinkage," Journal of the American Statistical Association, pp. 1200-1224, 1995) using three-layer multi-resolution approach with db7 wavelets. FIG. 2B, box 14 represents the removal of the mean and noise from the seismic data. In box 15, as part of the detection stage, a processor uses a Multi-scale Symbolic Time Series Algorithm (MSTSA) to detect the presence of an activity at faster time scale (small time duration (window)) against the null hypothesis of no activity, the data de-noising is conducted At box 13, the gait analysis is determined for the inputted signal. In box 19, the probability of the inputted signal representing digging or walking is assessed. In the activity classification stage, Multi-scale Symbolic Time Series Algorithm (MSTSA) (box 18) along with extracted gait period (from box 13) classify and segment walking (box 21) vs. digging at slower time scale (larger time duration (window)) via support vector machine (SVM) classifier.

As to data preprocessing and partitioning, envelop detection via Hilbert transform is carried out on the time series to reduce the phase distortions in the seismic data for both activity detection and classification. In the next step, auto-correlation of the temporal envelop is obtained with different window sizes for different stages of activity recognition (i.e., detection and classification). This auto-correlation function is used as an input to the Multi-scale Symbolic Time Series Algorithm (MSTSA) technique because it can capture the difference in periodicity pattern between walking and digging.

FIG. 3 illustrates data preprocessing steps for walking and digging over 10 s window (sampling rate=1 kHz). The auto-correlation function, corresponding to a certain window, is partitioned via uniform partitioning based on the current data. The partitioning information is not kept constant over the whole sample of training and testing to facilitate the understanding of the texture change in the data, not the change of amplitude. Once the symbol sequence is created after partitioning, it is fed into Multi-scale Symbolic Time Series Algorithm (MSTSA) for activity recognition The Multi-scale Symbolic Time Series Algorithm (MSTSA) has two main steps, namely, 1) Detection of Activity (as shown in FIG. 4), and 2) Partial classification of Activity as shown in FIG. 5.

FIG. 4 illustrates in box 14A the removal of the mean and de-noising of the data signal by the computer or processor.

Figure 7:
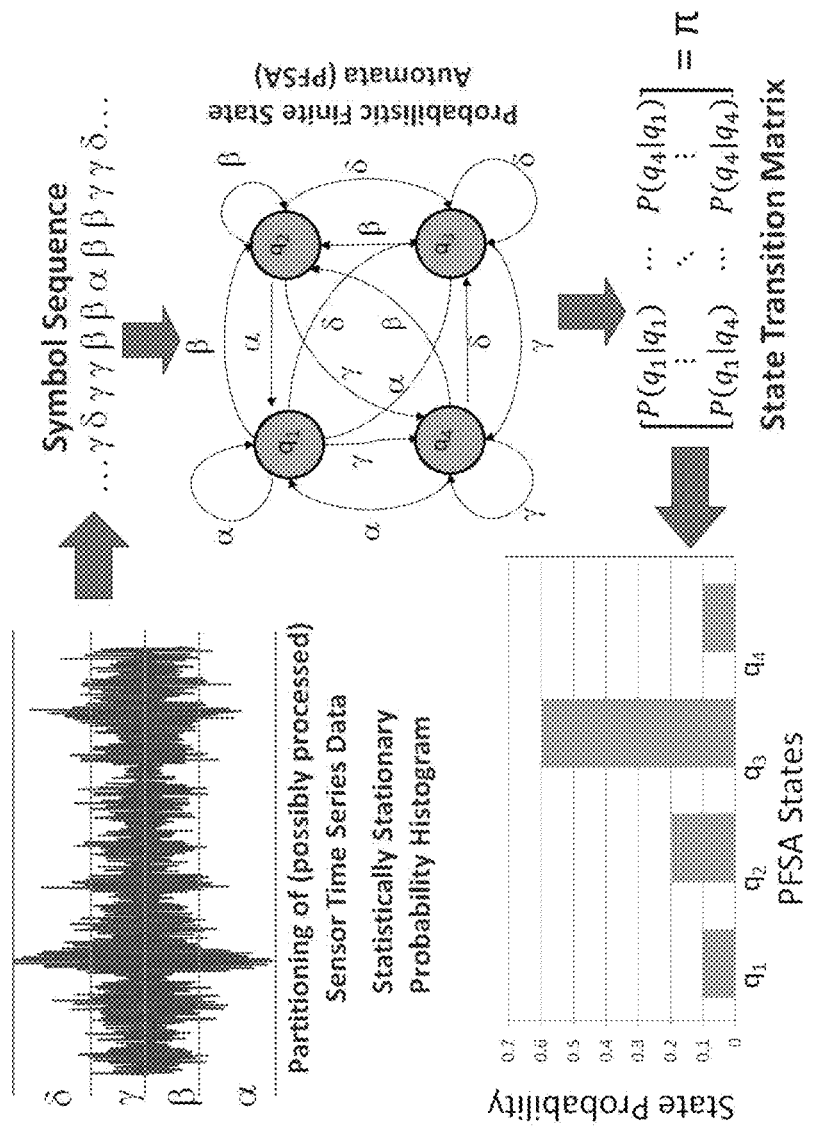
FIG. 7 is a diagrammatic illustration of the development of probabilistic finite state automaton.

Once the auto correlation is completed by the computer or processor in box 15A, the data signal is segmented into N segments using overlapping windows, with an overlap of 80%, as represented by box 15B of FIG. 4. Continuing in the flow chart of FIG. 4, box 23 the integer I is incremented by 1 for each segment of the data signal. Box 24 indicates whether or not the last segment N has been processed. If the answer is no, the subroutine continues to box 27 wherein a symbol for each of the N segments of data is generated. Each segmented data is now symbolized to generate a probabilistic finite state automaton as shown in FIG. 7. In box 28, a Short-Length Symbolic Time-Series Online Classifier (SSTOC) is used to estimate the probability of activity. In Box 26, the integer i is incremented and the subroutine returns to box 24. If all N segments have been processed, the probabilities are outputted as represented by box 25, which continues at the top of FIG. 5.

FIG. 5 illustrates the classification portion of the MSTSA (part 2) Data is divided into two second windows, the two second windows have 80% overlap (see box 29). The windows are then represented by symbols Bi (box32), where i goes from 1 to m (box 31) and m=2f (frequency) Short Length Symbolic Time Series Online classifier (SSTOC) (box 33) estimates probability of activity.

Figure 6:
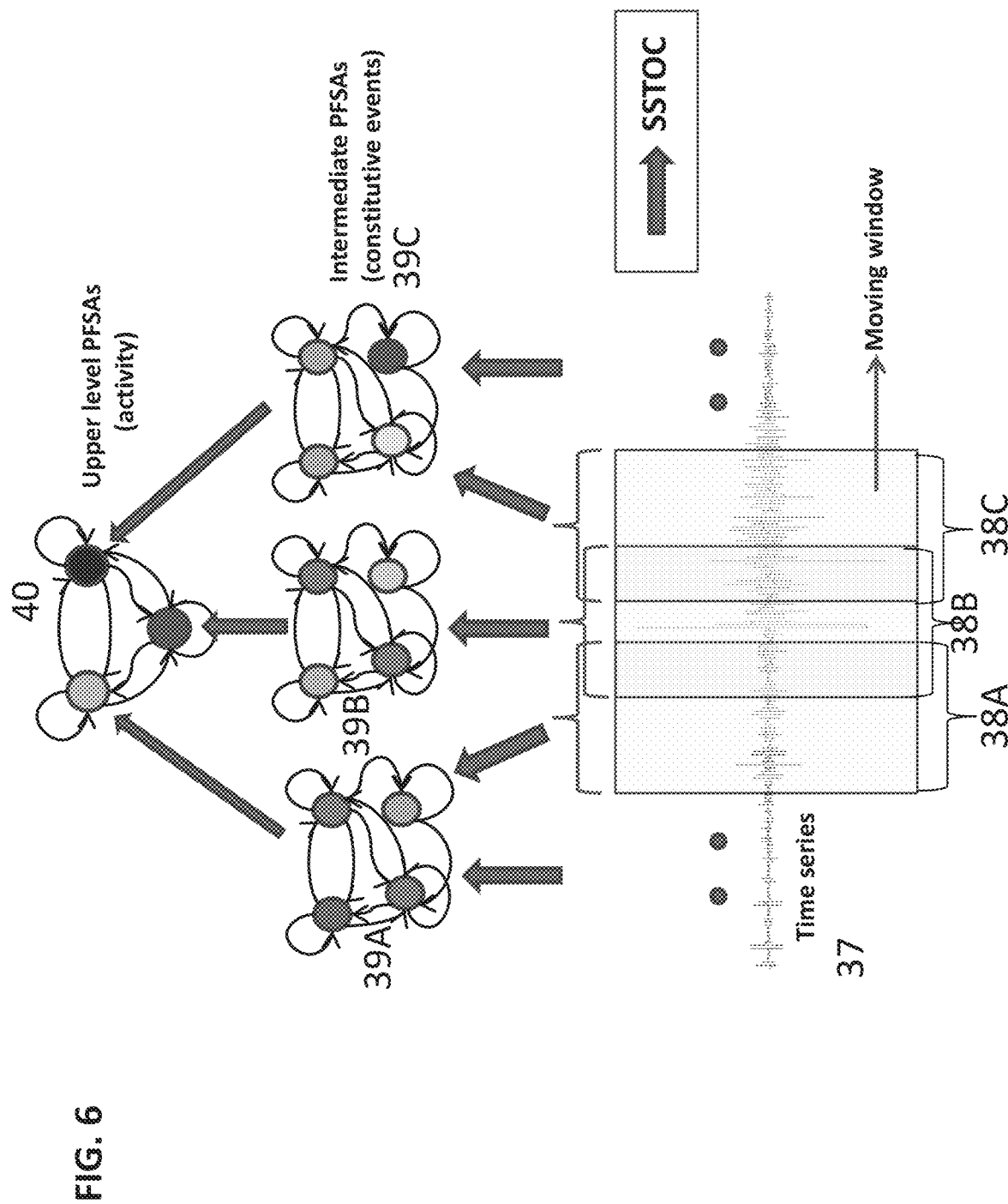
FIG. 6 is a diagrammatic illustration of the schematics of the MSTSA framework.

FIG. 6 is a diagrammatic illustration of the Short Length Symbolic Time Series Online classifier (SSTOC) process (indicated by upward arrows). The time series is segmented into overlapping windows 38A, 38B and 38C, shown in FIG. 6 are the intermediate probabilistic finite state automatons (PFSAs) (39A, 39B and 39C) and Upper level PFSA 40.

Symbolization of Time-Series:

The sensor time series is encoded by data partitioning in the range of the signal, where the conversion to symbol strings is achieved by substituting each (real-valued) data point in the time series by a symbol corresponding to the region (i.e., interval) within which the data point lies. This step enables transformation of the sensory information from the continuous domain to the symbolic domain; in other words, the sensor data at each sampling is replaced by a symbol. Thus, as shown at the top of FIG. 7, the time series data is used to generate the symbols $\alpha, \beta, \gamma, \ldots$ if the data levels fall in certain voltage ranges.

Probabilistic Finite State Automaton (PFSA) Construction

The symbolic sequence is modeled as a probabilistic finite state automaton (PFSA) (FIG. 7) that is constructed as a tuple $G=(Q, \Sigma, \delta, \Pi)$, where the alphabet $\Sigma$ is a nonempty finite set of symbols and the set of states Q is constrained to be nonempty and finite. This invention disclosure considers only a class of PFSA, known as D-Markov machines, where the states are strings of the D past symbols; the positive integer D is called the depth of the machine and the number of states $|Q| \leq |\Sigma|^D$, where $|\Sigma|$ indicates the number of elements in the set $\Sigma$. Given the previous state and observed symbol, the state transition function $\delta: Q \times \Sigma \to Q$ yields the new state. In addition, the morph function $\pi: Q \times \Sigma \to [0, 1]$ is an output mapping that satisfies the condition: $\Sigma_{\sigma \in \Sigma} \pi(q, \sigma)=1$ for all $q \in Q$. The morph function $\pi$ has a matrix representation $\Pi$, called the (probability) morph matrix of dimension ($|Q| \times |\Sigma|$). Each row sum of $\Pi$ is equal to 1 and each matrix element $\Pi_{ij}$ is strictly positive due to the finite length constraint of time series from which PFSA models are constructed.

Each row of row of $\Pi$ is considered as a random vector. The preferred embodiment system determines its distribution so that when such a random vector is generated by a symbol sequence the state (class) from which it can be estimated. For detection or classification it can be seen from the flowchart in FIGS. 4 and 5 that Short-Length Symbolic Time-Series Online Classifier (SSTOC) is used, which is a building block of Multi-scale Symbolic Time Series Algorithm (MSTSA). Steps in implementing SSTOC are described in the following.

Figure 8:
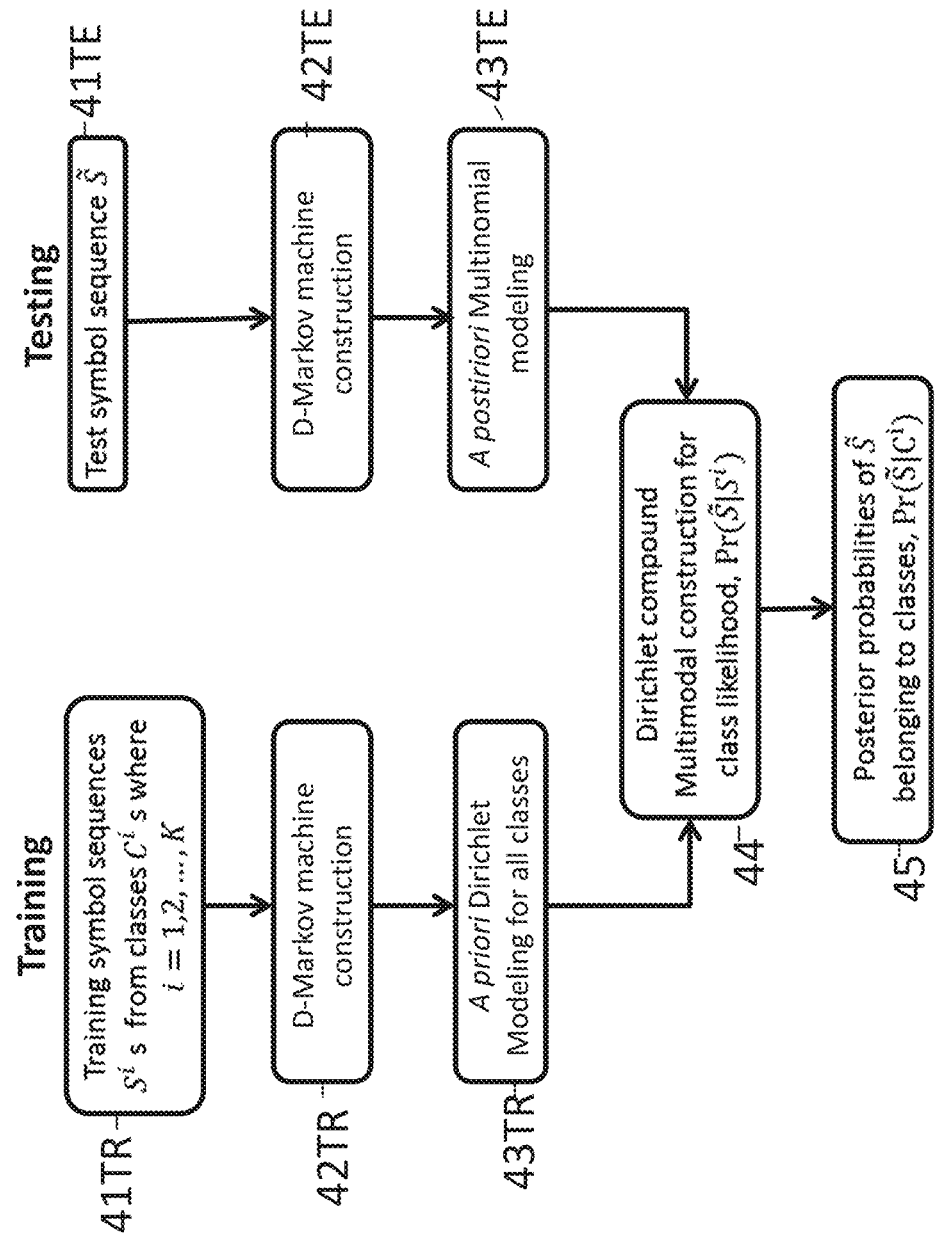
FIG. 8 is an illustration of a flow chart for the Short-Length Symbolic Time-Series Online Classifier (SSTOC) used in a preferred embodiment of the present invention.
Figure 9:
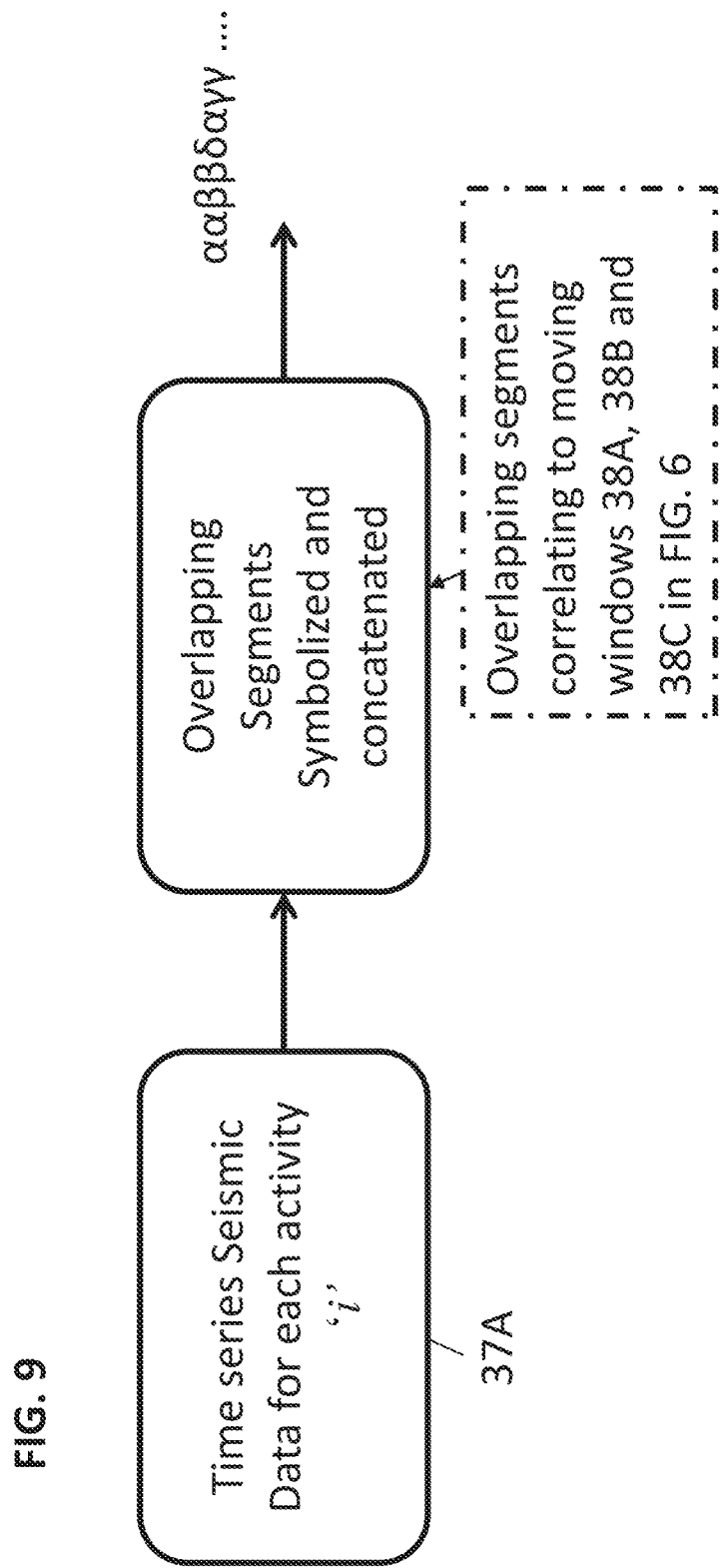
FIG. 9 is an illustration showing the generation of symbol stream Si for each activity/class, 'i'.

Short-Length Symbolic Time-Series Online Classifier (SSTOC):

This formulation quantitatively incorporates the effects of finite-length symbol strings in both training and testing phases of pattern classification. The Dirichlet and multinomial distributions have been used to construct the a priori and a posteriori models of uncertainties, respectively. The mathematical background and details for this can be found in S. Sarkar, K. Mukherjee, S. Sarkar, and A. Ray, "Symbolic dynamic analysis of transient time series for fault detection in gas turbine engines," *ASME Journal of Dynamic Systems, Measurement and Control*, vol. 135, pp. 14506-1-14506-6, January 2013, herein incorporated by reference and hereinafter Sarkar article. Here we provide the practical aspects in implementing the Short-Length Symbolic Time-Series Online Classifier (SSTOC). There are two phases for SSTOC, namely, training and testing phase as shown in FIG. 8.

Figure 10:
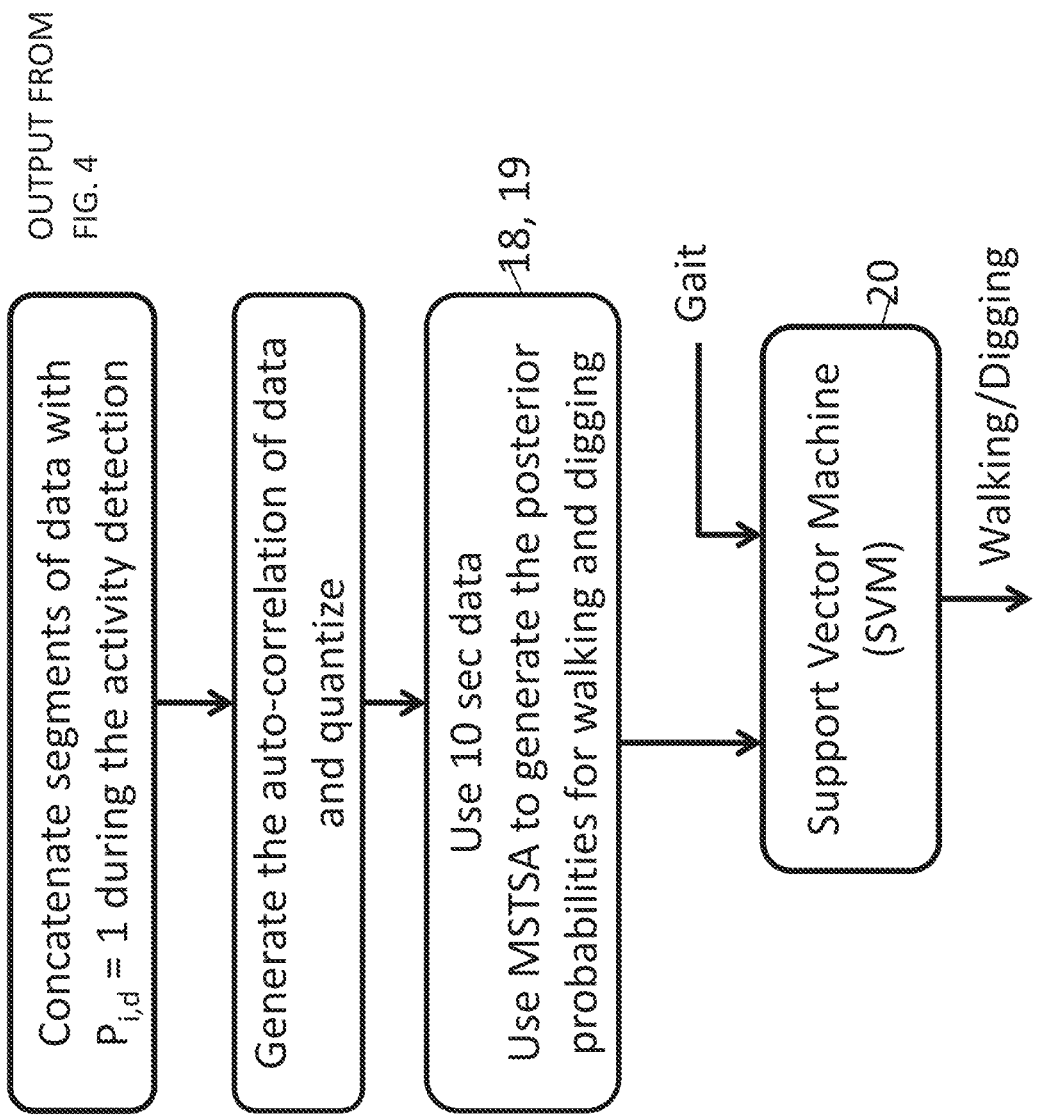
FIG. 10 is a flow chart of a classification sequence showing blocks 19 and 20 of FIG. 2B for classification of activity as walking or digging using Gait information.

TRAINING ALGORITHM FOR SSTOC: The training algorithm for the SSTOC comprises the following steps:

Step 1—For each set of data belonging to a particular activity 'i' segment the data and symbolize and concatenate it as shown in box 49 of FIG. 10. The sequence of symbols is denoted by $S^i$ for $i^{th}$ activity. (Box 41TR). The corresponding Box 41TE represents the test symbol sequence.

Step 2—Construct D-Markov machine and generate the PFSA, that is, estimate the $Q^i$ and $\Pi^i$ for each class/activity i. (Box 42TR). The corresponding Box 42TE represents the testing phase.

Step 3—Estimate the number of times a particular symbol is emitted by a given state, that is, find $N^i$, where i denotes the class/activity, m state $m \in Q^i$ and n symbol. The number $N^i$ will be used to compute the posteriori probabilities of an activity/class. (Box 45).

Experiments

The objective is to detect and classify different human activities from seismic signature in real time. One of the most significant and dreaded threat scenarios in tactical situations is comprised of the activities such as, a personnel walking to a site and digging there to bury explosives and walking away. It is challenging to detect and segment such activities from only seismic signature in real time because of its inherent multi-timescale nature with low SNR in varied environmental conditions. Also, the persistence level and type of digging activity have a significant variability, which make the problem more complex. In a seismic signal, both of the activities are viewed as an array of near-identical impulses of fast time scale. But, it is the time evolution of those impulse units in slower time scale that captures the separability of those activities.

Experiments on activity recognition were conducted on a moderately moist field to simulate the scenarios mentioned above. FIG. 1B presents the schematics describing the experiments for data collection. Two 3-axis geophones were deployed as seismic sensors at distances of 4 m and 8 m from the site of digging. A typical run of the data collection is 90 s long and it comprises the activities such as walking to the site of digging, digging at the site, walking away from the site in order. It also has certain segments, before and after the activities, where there is no activity happening around the sensor.

Different routes were followed for walking around the sensors to incorporate the effect of distance of target from the sensors. Two types of tools (i.e. spade shovel and metal hoe) were used for digging. The digging activities were performed with different speed and impact to achieve a realistic variability in the data. Walking activity involved both single person and multiple people (mostly two). Thirty sets of 90 seconds long data (FIG. 2A) was collected in total at a sampling rate of 4 kHz. All the different scenarios (e.g., digging type, number of walking persons etc.), as described above, are equally distributed in the dataset for training.

The problem of activity recognition is seen as a bi-layer classification problem as shown in the FIG. 2B. In the detection stage, Multi-scale Symbolic Time Series Algorithm (MSTSA) detects the presence of an activity at faster time scale (small window) against the null hypothesis of no activity; in the activity classification stage, Multi-scale Symbolic Time Series Algorithm (MSTSA) classifies and segments walking vs. digging at slower time scale (larger window). While the detection stage should be robust to reduce the false alarm rates, the classification stage must be sufficiently sensitive to discriminate among walking and digging with high fidelity and small segmentation time delay.

Multi-Scale Symbolic Time Series Analysis (MSTSA) Framework and Solution Approach A preferred embodiment of the present invention utilizes an MSTSA framework for activity recognition from seismic signature at multiple time scale. SSTOC, the building block of Multi-scale Symbolic Time Series Algorithm (MSTSA), is described along with the steps of data symbolization.

Symbolization of Time-Series

A compact (i.e., closed and bounded) region $\Omega \in R^n$, where $n \in N$, within which the time series is circumscribed, is identified. The space of time series data sets may be represented as $Q \subseteq R^{n \times N}$, where the $N \in N$ is sufficiently large for convergence of statistical properties within a specified threshold. (Note: n represents the dimensionality of the time series and N is the number of data points in the time series.) Encoding of $\Omega$ is accomplished by introducing a partition $B \equiv \{B_0, \ldots, B_{(m-1)}\}$ consisting of m mutually exclusive (i.e., $B_j \cap B_k = 0 \; \forall j \neq k$), and exhaustive (i.e., $\cup_{j=0}^{m-1} B_j = \Omega$) cells. Let each cell be labeled by symbols $s_j \in E$, where $\Sigma = \{s_0, \ldots, s_{m-1}\}$ is called the alphabet. This process of coarse graining can be executed by uniform, maximum entropy, or any other scheme of partitioning. Then, the time series, which visit the cell $B_1$, are denoted as $s_j \forall j=0, 1, \ldots, m-1$. This step enables transformation of the time series to a symbol sequence $\{s\}$.

PFSA Construction

The symbolic sequence is modeled as a probabilistic finite state automaton (PFSA) that is constructed as a tuple G, $(Q,\Sigma,\delta,\Pi)$, where the alphabet $\Sigma$ is a nonempty finite set of symbols and the set of states Q is constrained to be nonempty and finite. Although others may be used, this specification describes a class of PFSA, known as D-Markov machines as reported in A. Ray, "Symbolic dynamic analysis of complex systems for anomaly detection," *Sig. Process.*, vol. 84, no. 7, pp. 1115-1130, 2004 (herein incorporated by reference), where the states are strings of the D past symbols; the positive integer D is called the depth of the machine and the number of states $|Q| \leq |\Sigma|^D$. Given the previous state and an observed symbol, the state transition function $\delta$: $Q \times \Sigma \rightarrow Q$ yields the new state. In addition, the morph function $\pi$: $Q \times E \rightarrow [0,1]$ is an output mapping that satisfies the condition: $P\sigma_{\in \Sigma} \pi(q,\sigma)=1$ for all $q \in Q$. The morph function $\pi$ has a matrix representation $\Pi$, called the (probability) morph matrix of dimension $(|Q| \times |\Sigma|)$. Each row sum of $\Pi$ is equal to 1 and each matrix element $\Pi_{ij}$ is strictly positive due to the finite length constraint of time series from which PFSA models are constructed. Adenis, Y. Wen, and A. Ray, "An inner product space on irreducible and synchronizable probabilistic finite state automata," Math. Control Signals Syst., vol. 23, no. 4, pp. 281-310, 2012 (herein incorporated by reference.

SSTOC

This formulation quantitatively incorporates the effects of finite-length symbol strings in both training and testing phases of pattern classification. The Dirichlet and multinomial distributions have been used to construct the a priori and a posteriori models of uncertainties, respectively. See box 43TR and box 43TE in FIG. 8 for a schematic representation.

The symbol K is used to designate K symbolic systems (i.e., classes) of interest, denoted by $C_1, C_2, \ldots, C_K$, over the same alphabet $\Sigma$. Each class $C_i$ is modeled by an ergodic (equivalently, irreducible) PFSA=$G^i=(Q^i,\Sigma^i,\delta^i,\Pi^i)$, where i=1, 2 ..., K. During the training phase, a symbol string $S^i \triangleq s_1^i s_2^i \ldots s_{N_i}^i$ is generated from each class $C_i$. The state transition function S and the set of states Q of the D-Markov machine are fixed by choosing an appropriate depth D. Thus, $\Pi^i$'s become the only unknowns and could be selected as the feature vectors for the purpose of classification. The distribution of the morph matrix $\Pi^i$ is computed in the training phase from the finite length symbol sequences for each class.

In the testing phase, let another symbol string S be to determine the class of this observed symbol string So by calculating its posterior. Then, the task is to determine the class of this observed symbol string S by calculating its posterior.

In the training phase, each row of $\Pi^i$ is treated as a random vector. Let the $m^{th}$ row of $\Pi^i$ be denoted as $\Pi^i_m$ and the $n^{th}$ element of the $m^{th}$ row as $\Pi_{mn}^i > 0$ and $\Sigma_{n=1}^{|\Sigma|} \Pi_{mn}^i = 1$.

The a priori probability density function $f_{\Pi^i_m|S^i}$ of the random row-vector $\Pi_m^i$, conditioned on a symbol string $S^i$, follows the Dirichlet distribution as described below.

$$f_{\Pi^i_m|S^i}(\theta_m^i | S^i) = \frac{1}{B(\alpha_m^i)} \prod_{n=1}^{|\Sigma|} (\theta_{mn}^i)^{\alpha_{mn}^i - 1} \quad (1)$$

where $\theta^i_m$ is a realization of the random vector $\Pi^i_m$, namely, $\theta_m^i [\theta_{m1}^i \; \theta_{m2}^i \; \ldots \; \theta_{m|\Sigma|}^i]$ and the normalizing constant is $$B(\alpha_m^i) = \frac{\prod_{n=1}^{|\Sigma|} \Gamma(\alpha_{mn}^i)}{\Gamma\left(\sum_{n=1}^{|\Sigma|} \alpha_{mn}^i\right)} \quad (2)$$

where $\alpha_m^i \triangleq [\alpha_{m1} \alpha_{m2}^i \; \ldots \; \alpha_{m|\Sigma|}^i]$ with $\alpha_{mn}^i = N_{mn}^i + 1$ and $N_{mn}^i$ is the number of times the symbol $\sigma_n$ in $S^i$ is emanated from the state $q_m$, i.e., $$N_{mn}^i \triangleq |\{(s_k^i, v_k^i) : s_k^i = \sigma_n, v_k^i = q_m\}| \quad (3)$$

where $s^i_k$ is the $k^{th}$ symbol in $S^i$ and $v_k^i$ is the $k^{th}$ state as derived from the symbolic sequence $S^i$. Recall that a state is defined as a string of D past symbols. Then, the number of occurrence of the state $q_m$ in the state sequence is given by $N_m^i \triangleq \Sigma_{n=1}^{|\Sigma|} N_{mn}^i$. It follows from Eq. (2) that $$B(\alpha_m^i) = \frac{\prod_{n=1}^{|\Sigma|} \Gamma(N_{mn}^i + 1)}{\Gamma\left(\sum_{n=1}^{|\Sigma|} N_{mn}^i + |\Sigma|\right)} = \frac{\prod_{n=1}^{|\Sigma|} (N_{mn}^i)!}{(N_m^i + |\Sigma| - 1)!} \quad (4)$$

by use of the relation $\Gamma(n)=(n-1)! \forall n \in \mathbb{N}_1$.

By the Markov property of the PFSA $G^i$, the $(1 \times |\Sigma|)$ row vectors, $\{\Pi_m^i\}$, $m=1, \ldots |Q|$, are statistically independent of each other. Therefore, it follows from Eqs. (1) and (4) that the a priori joint density $f_{\Pi^i|S^i}$ of the probability morph matrix $\Pi^i$, conditioned on the symbol string $S^i$, is given as $$f_{\Pi_m^i|S^i}(\theta^i | S^i) = \prod_{m=1}^{|Q|} f_{\Pi_m^i|S^i}(\theta_m^i | S^i) \quad (5)$$

$$= \prod_{m=1}^{|Q|} (N_m^i + |\Sigma| - 1)! \prod_{n=1}^{|\Sigma|} \frac{(\theta_{mn}^i)^{N_{mn}^i}}{(N_{mn}^i)!}$$

where $\theta^i = [(\theta_1^i)^T (\theta_2^i)^T \ldots (\theta_{|q|}^i)^T] \in [0, 1]^{|Q| \times |\Sigma|}$ In the testing phase, the probability of observing a symbol string Se belonging to a particular class of PFSA $(Q, \Sigma, \delta, \Pi^i)$ is a product of independent multinomial distribution given that the exact morph matrix $\Pi^i$ is known.

$$Pr(\tilde{S}|Q, \delta, \Pi^i) = \prod_{m=1}^{|Q|} (\tilde{N}_m)! \prod_{n=1}^{|\Sigma|} \frac{(\Pi_{mn}^i)^{\tilde{N}_{mn}}}{(\tilde{N}_{mn})!} \quad (6)$$

$Pr(\tilde{S}|\Pi^i)$ as $Q$ and $\delta$ are kept invariant. (7)

Similar to $N_{mn}^i$ defined earlier for $S^i$, $\tilde{N}_{mn}$ is the number of times the symbol $a_n$ is emanated from the state $q_m \in Q$ in the symbol string Se in the testing phase, i.e., $$\tilde{N}_{mn} \triangleq |\{(\tilde{s}_k^i, \tilde{v}_k^i) : \tilde{s}_k^i = \sigma_n, \tilde{v}_k^i = q_m\}| \quad (8)$$

where $s_k$ is the $k^{th}$ symbol in the string S and $v_k$ is the $k^{th}$ state derived from S. It is noted that $\triangleq$ The results, derived in the training and testing phases (see FIG. 8), are now combined according to Dirichlet Compound Multinomial model (DCM) construction. Given a symbol string Si in the training phase, the probability of observing a symbol string S in the operation phase is obtained as $$Pr(\tilde{S} | S^i) = \int \ldots \int Pr(\tilde{S} | \Pi^i = \theta^i) f_{\Pi^i|S^i}(\theta^i | S^i) d\theta^i = \quad (9)$$

$$\int \ldots \int \left[\prod_{m=1}^{|Q|} (\tilde{N}_m)! \prod_{n=1}^{|\Sigma|} \frac{(\theta_{mn}^i)^{\tilde{N}_{mn}}}{(\tilde{N}_{mn})!}\right] \times$$

$$\prod_{m=1}^{|Q|} \left[(N_m^i + |\Sigma| - 1)! \prod_{n=1}^{|\Sigma|} \frac{(\theta_{mn}^i)^{N_{mn}^i}}{(N_{mn}^i)!} d\theta_{mn}^i\right] =$$

$$\prod_{m=1}^{|Q|} (\tilde{N}_m)!(N_m^i + |\Sigma| - 1)! \times \frac{\int \ldots \int \prod_{n=1}^{|\Sigma|} (\theta_{mn}^i)^{\tilde{N}_{mn} + N_{mn}^i} d\theta_{mn}^i}{\prod_{n=1}^{|\Sigma|} (\tilde{N}_{mn})!(N_{mn}^i)!}$$

There exists a closed form solution for $Pr(Se|S^i)$ as referenced in S. Sarkar, K. Mukherjee, S. Sarkar, and A. Ray, "Symbolic dynamic analysis of transient time series for fault detection in gas turbine engines," ASME Journal of Dynamic Systems, Measurement and Control, vol. 135, pp. 14506-1-14506-6, January 2013, and Y. Wen, K. Mukherjee, and A. Ray, "Adaptive pattern classification for symbolic dynamic systems," Signal Processing, vol. 93, pp. 252-260, January 2013, both of which are herein incorporated by reference, which is as follows $$Pr(\tilde{S} | S^i) = \prod_{m=1}^{|Q|} \frac{(\tilde{N}_m)!(N_m^i + |\Sigma| - 1)!}{(\tilde{N}_m + N_m^i + |\Sigma| - 1)!} \times \prod_{n=1}^{|\Sigma|} \frac{(\tilde{N}_{mn} + N_{mn}^i)!}{(\tilde{N}_{mn})!(N_{mn}^i)!}$$

It is recommended to compute the logarithm of $Pr(S|S^i)$ by using Stirling's approximation formula $\log(n!) \approx n \log(n) - n$ because both $N^i$ and N would be large numbers. The posterior probability of a symbol string S belonging to the class $C_i$ is denoted as $Pr(C_i|\tilde{S})$ and is given as $$Pr(C_i | \tilde{S}) = \frac{Pr(\tilde{S} | S^i) Pr(C_i)}{\sum_{j=1}^{K} Pr(\tilde{S} | S^j) Pr(C_j)}, i = 1, 2, \ldots, K \quad (11)$$

where $Pr(C_i)$ is the known prior distribution of the class $C_i$. It is assumed to have uniform distribution in this paper. When there are L number of symbol sequences (indexed by l), $S_l^i$ for training a class $C_i$, the posterior probability is $$Pr(C_i | \tilde{S}) = \frac{\sum_{l=1}^{L} Pr(\tilde{S} | S_l^i) Pr(C_i)}{\sum_{j=1}^{K} \sum_{l=1}^{L} Pr(\tilde{S} | S_l^j) Pr(C_j)}, i = 1, 2, \ldots, K \quad (12)$$

The final classification decision is made as follows.

$$D_{class} = \underset{i}{\operatorname{argmax}} \, Pr(C_i | \tilde{S})$$

Multi-Scale Symbolic Time Series Analysis (MSTSA)

In general, an activity is constituted of intermediate events happening at faster time scale. Multi-Scale Symbolic Time Series Analysis (MSTSA) is built upon SSTOC to tackle time series at multiple time scale for activity recognition in real time. FIG. 6 shows the schematics of the Multi-Scale Symbolic Time Series Analysis (MSTSA) framework. At the bottom layer, a time window is traversed over the time-series with a certain overlap. The length of the time window depends on the time-scale of the intermediate events which combine to form the whole activity. The signal from the window, is symbolized via preprocessing and subsequently, PFSA is constructed. SSTOC is necessary as it can analyze short length time series coming from a limited length window. Posterior probability of PFSAs for intermediate patterns are calculated via SSTOC, which is shown in the second layer of FIG. 6. This step yields in a time series of posterior probability of constitutive events (denoted by different intermediate PFSAs) with a lesser resolution than the original signal. More the overlap, more the resolution of time series would be. In the next step, SSTOC is applied on the time series of intermediate pattern symbols at slower time scale to obtain the posterior probability of upper level PFSA. This PFSA denotes the activity whose states and transition probabilities are learnt from intermediate patterns (at faster time scale) via SSTOC. This step is also called short term smoothing as it captures the persistence of activity, resulting in a reduced false alarm.

Results

The data preprocessing and feature extraction along with the performance of Multi-scale Symbolic Time Series Algorithm (MSTSA) in activity recognition from data collected via seismic sensor is explained hereinafter.

Regarding data preprocessing and partitioning, initially seismic time series is converted to zero mean signal and down-sampled to 1 kHz from 4 kHz. Then, it is denoised via wavelet de-noising method (SureShrink thresholding as set forth in D. L. Donoho and I. M. Johnstone, "Adapting to unknown smoothness via wavelet shrinkage," Journal of the American Statistical Association, pp. 1200-1224, 1995 herein incorporated by reference) using three-layer multi-resolution approach with db7 wavelets. For both activity detection and classification, envelop detection via Hilbert transform is done on the time series to reduce phase distortions in the seismic data. Then, autocorrelation of the temporal envelop is obtained with different window sizes for different stages of activity recognition (i.e., detection and classification). This autocorrelation function is used as an input to Multi-scale Symbolic Time Series Algorithm (MSTSA) because it can capture the difference in periodicity pattern between walking and digging. FIG. 3 shows the data preprocessing stages for walking and digging signals over 10 s window.

As illustrated in FIG. 3, the autocorrelation function from a window is partitioned via uniform partitioning based on the current data. The partitioning information is not kept constant over the whole sample of training and testing to facilitate the understanding of the texture change in the data, not amplitude variation.

Figure 11:
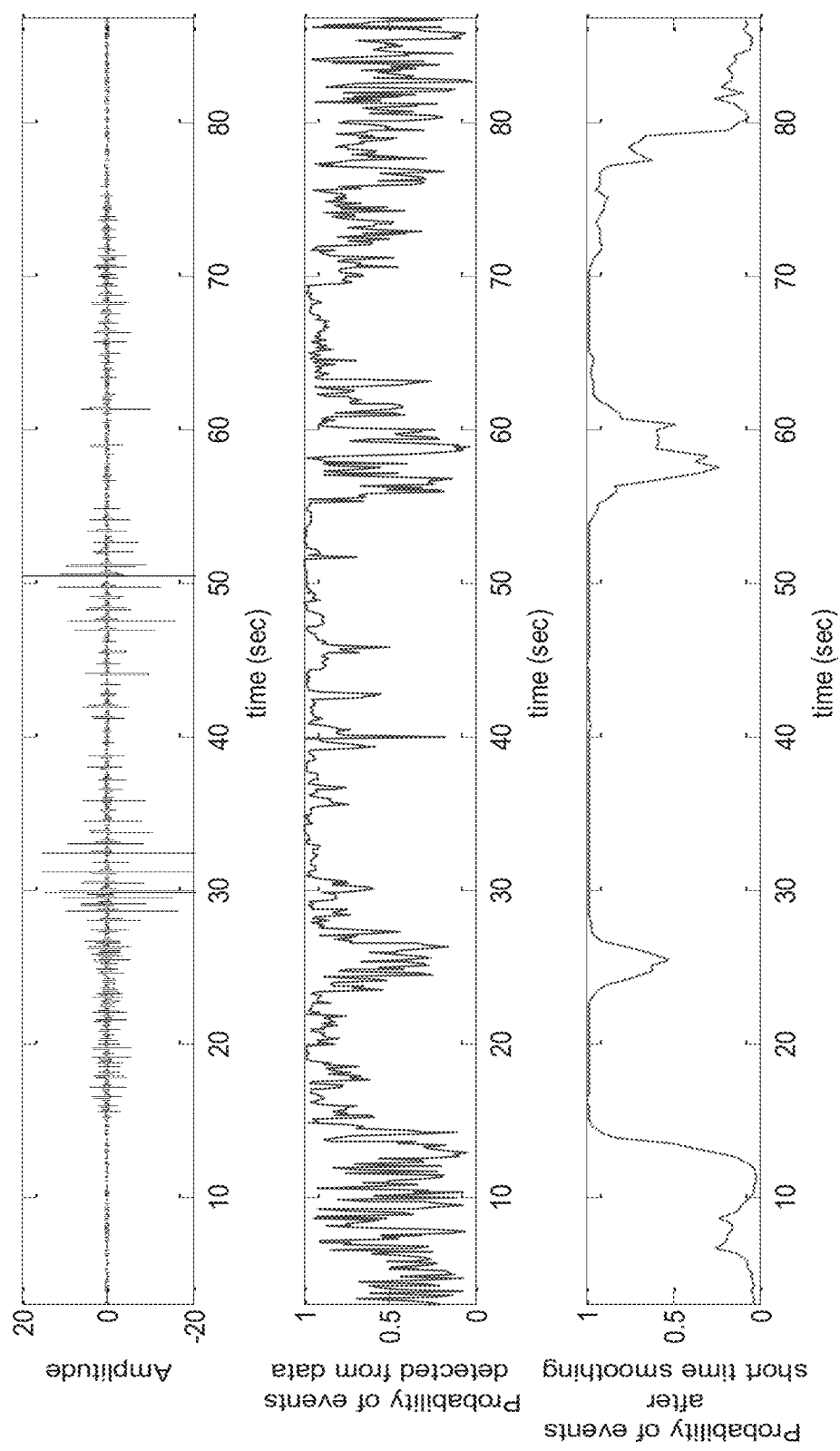
FIG. 11 illustrates an activity detection from a 90 s seismic signal via Multi-scale Symbolic Time Series Algorithm (MSTSA). The second plot from top of the figure shows the posterior probability of intermediate events happening around the sensor at fast time scale, which has false alarms in the 'no activity' zone (posterior threshold for activity decision=0.5). The third ploy from the top of the figure shows the probability of events after short time smoothing.

Once the symbol sequence is created after partitioning, it is fed into Multi-scale Symbolic Time Series Algorithm (MSTSA) for activity recognition. As depicted in FIG. 11, as to Activity Detection, this step detects activities (walking or digging) against the null hypothesis of no activity around the seismic sensors. A window of 2 s is traversed over the seismic signal with 80% overlap. The window size is considered to be 2 s because it can capture at least one complete human gait pattern (~0.6-0.7 s between two consecutive footsteps for single human walking) or two digging impulses. Hence, at least one dominant peak can be found on autocorrelation function when there is some activity. Uniform partitioning, with an alphabet size of three, is used to symbolize the autocorrelation function which is obtained by the method described in subsection IV-A. FIG. 6 shows the steps of activity detection on a 90 s seismic signal by the proposed technique of Multi-scale Symbolic Time Series Algorithm (MSTSA). The ground truth for the signal, as shown in the top most plot of figure, is as follows: no activity at $0 \ s < t \leq 13.5 \ s$, activity at $13.5 \ s < t \leq 79 \ s$ and no activity at $79 \ s < t \leq 90 \ s$.

Posterior probability of intermediate events, based on 50% training from both the geophones, is calculated via SSTOC (D=1) over time. The second plot from top of FIG. 11 shows the posterior probability of intermediate events happening around the sensor at fast time scale, which has false alarms in the 'no activity' zone (posterior threshold for activity decision=0.5). To reduce the false alarm, the persistence of the activity is incorporated via short time smoothing (lower most graph in FIG. 11). Short time smoothing, the second stage of Multi-scale Symbolic Time Series Algorithm (MSTSA), is operated on the symbolized form of the intermediate posterior probability. Regarding this problem, a window of 40 symbols is traversed over the symbol sequence of posterior probability and the final posterior of activity is obtained via SSTOC at a slower time scale. At this stage, transition matrices for training are constructed with a symbol size of three and a depth equal to one. Out of the two transition matrices for training of intermediate posterior probability symbol sequence, one has persistence of the activity and other shows fluctuations in fast time scale. In FIG. 6, the plot at the bottom presents the final posterior probability of activity. Table I denotes that the average accuracy of activity detection can achieve 98.8% with a false alarm rate of 1.5% obtained via cross validation. FIG. 11 illustrates activity detection from a 90 s seismic signal via Multi-scale Symbolic Time Series Algorithm (MSTSA)

TABLE 1

Performance of MSTSA in activity recognition from seismic time-series

| | | |
|---|---|---|
| Activity Detection | Accuracy 98.8% | False alarm rate 1.5% |
| Activity Classification | Accuracy 91.2% | False alarm rate 5.2% |

As to activity classification, the segments on the seismic time series, which are detected to be having some activity, are fed into the next layer of the activity recognition framework, namely, activity classification. In this layer, 2-stage MSTSA is applied in the same way it is applied in the detection stage, but with a different window size. A longer window is required to capture the time evolution of walking and digging at slower time scale, such that it manifests enough class separability in training. In this paper, a window length of 10 s is used with 80% overlap. Large overlap is considered here to reduce the segmentation delay when activity switches from walking to digging or vice versa. Uniform partitioning is performed on the autocorrelation function (subsection IV-A) with an alphabet size of 6. A variable partitioning, dependent on the online data, is used to capture the signal texture variation.

Figure 12:
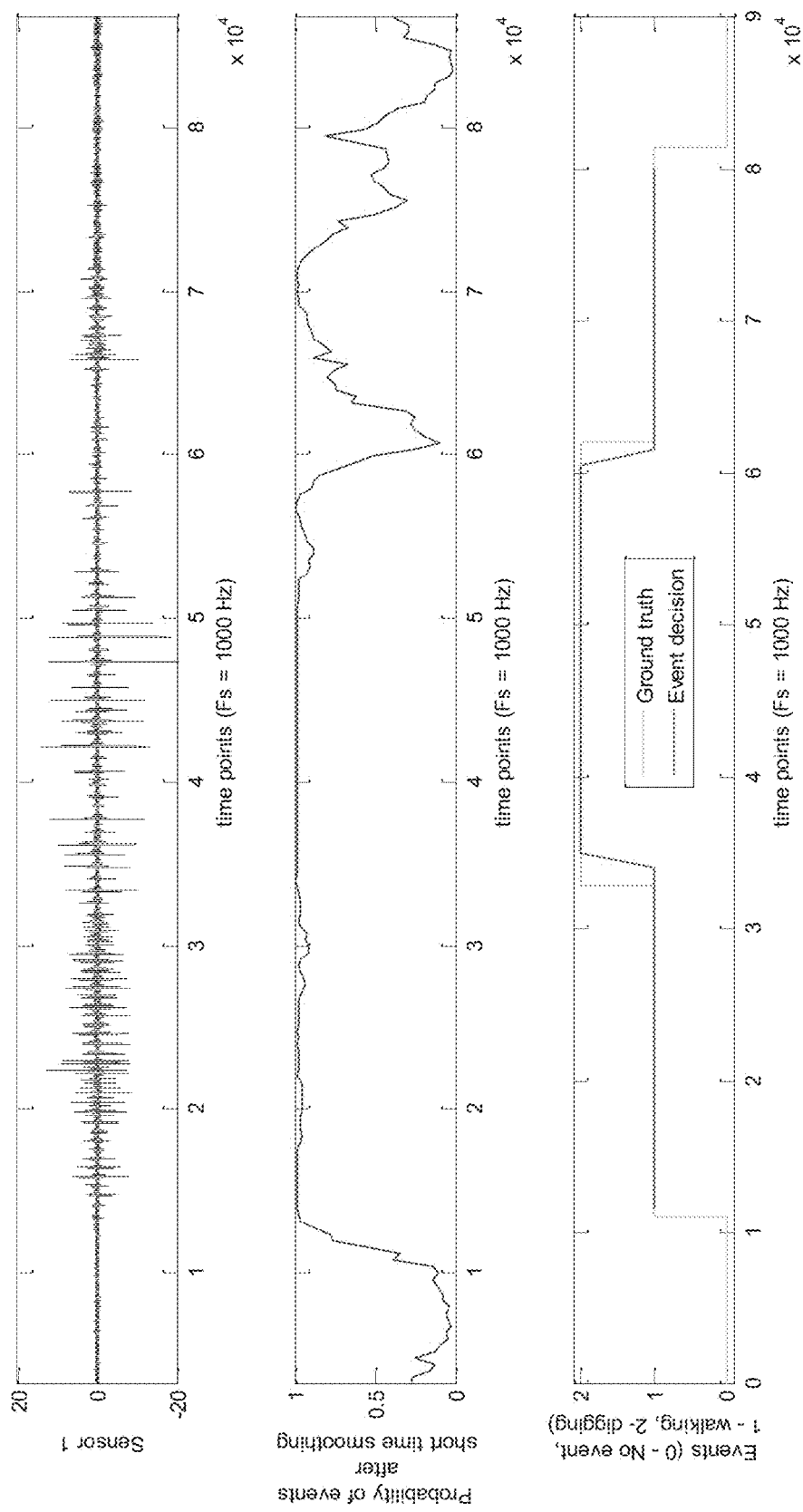
FIG. 12 illustrates major steps for activity detection from a 90 s seismic signal via Multi-scale Symbolic Time Series Algorithm (MSTSA). Starting from the top.

Starting from top, FIG. 12 shows a typical seismic signal spanning 90 s, the final probability of activity posterior for detection and a decision vector regarding activity classification with corresponding ground truth. Ground truth for this particular time-series is as follows: no activity at $0 \ s < t \leq 11 \ s$, two persons walking to the digging site at $11 \ s < t \leq 32.5.5 \ s$, digging activity with metal hoe at $32.5 \ s < t \leq 62 \ s$, two persons walking away from the site at $62 \ s < t \leq 81.5 \ s$ and no activity at $81.5 \ s < t \leq 90 \ s$. FIG. 7 denotes that the activities are detected with high accuracy and those are classified with a segmentation delay of 1.5 s which is small compared to the complete activity period.

An average classification accuracy of 91.2% (table I) is obtained, which is based on random testing with 50% training False alarm rate, misclassification of walking as digging, is averaged at 5.2% which is impressive. The total running time for activity recognition via MSTSA (MATLAB2010a, CPU 4 GB RAM), which starts from the feeding of 90 s long raw data and finishes at the final decision vector of activities, is of the order of 20 s. Hence, there would be enough time to feed the next 90 s of seismic signal into the MSTSA framework, with up to 50% overlap. This fact makes it possible to implement the proposed technique in real time. FIG. 11 illustrates major steps of activity recognition from a 90 s seismic signal via MSTSA.

A preferred embodiment of the present invention comprises a multi-scale symbolic time series analysis (MSTSA) framework for real-time activity recognition from seismic signature. It incorporates the short-length symbolic time-series online classifier (SSTOC) via Dirichlet Compound-Multinomial model (DCM) construction as the building block, which works on symbol sequences generated from seismic time-series and intermediate event class time-series at different time-scales. These building blocks, with different window sizes for different time scales, are cascaded in multiple layers for event detection and activity classification. Realistic data collection scenarios, consisting of varied activities such as walking and digging, were set up for experimental validation of the proposed framework. MSTSA achieved a detection accuracy of more than 98% with negligible false alarm rate and activity classification accuracy of 91.2% with 5.2% of false alarm (classifying walking as digging). MSTSA results in a small segmentation delay along with a short running time (~20 s for 90 s long seismic signal) for activity recognition, which makes the proposed technique applicable in real time. Other possible time-series analysis architecture include the Hierarchical Hidden Markov Model (HHMM) as referenced in s. Fine, Y. Singer, and N. Tishby, "The hierarchical hidden Markov model: Analysis and applications," *Machine Learning*, vol. 32, pp. 41-62, 1998, and/or J. Francoise, *Realtime Segmentation and Recognition of Gestures using Hierarchical Markov Models*. Master's thesis, Universite' Pierre et Marie Curie, Ircam, 2011, both of which are incorporated by reference.

As used herein the terminology Dirichlet-multinomial distribution is a probability distribution for a multivariate discrete random variable. It is also called the Dirichlet compound multinomial distribution (DCM) or multivariate Pólya distribution. It is a compound probability distribution, where a probability vector p is drawn from a Dirichlet distribution with parameter vector α and a set of discrete samples is drawn from the categorical distribution with probability vector p. The compounding corresponds to a Polya urn scheme. In document classification, for example, the distribution is used to represent the distributions of word counts for different document types. Source: Wikipedia.

As used herein the terminology Dirichlet distribution which may be denoted Dir(α) is a family of continuous multivariate probability distributions parameterized by a vector α of positive reals. It is the multivariate generalization of the beta distribution. Its probability density function returns the belief that the probabilities of K rival events are $x_i$ given that each event has been observed $\alpha_i-1$ times. Source: Wikipedia.

As used herein, the Dirichlet distribution of order K≥2 with parameters $\alpha_1, \ldots, \alpha_K>0$ has a probability density function with respect to Lebesgue measure on the Euclidean space $R^{K-1}$ given by $$f(x_1, \ldots, x_K; \alpha_1, \ldots, \alpha_K) = \frac{1}{B(\alpha)} \prod_{i=1}^{K} x_i^{\alpha_i - 1},$$

on the open (K−1)-dimensional simplex defined by:

$x_1, \ldots, x_{K-1} > 0$ $x_1 + \ldots + x_{K-1} < 1$ $x_K = 1 - x_1 - \ldots - x_{K-1}$ and zero elsewhere. Source: Wikipedia.

As used herein, the terminology Markov chain (discrete-time Markov chain or $DTMC^i$), is a random process that undergoes transitions from one state to another on a state space. It possesses a property that is usually characterized as "memorylessness": the probability distribution of the next state depends only on the current state and not on the sequence of events that preceded it. This specific kind of "memorylessness" is called the Markov property. Source: Wikipedia.

As used herein, the terminology autocorrelation, also known as serial correlation or cross-autocorrelation, means the cross-correlation of a signal with itself at different points in time. It is the similarity between observations as a function of the time lag between them. It is a mathematical tool for finding repeating patterns, such as the presence of a periodic signal obscured by noise, or identifying the missing fundamental frequency in a signal implied by its harmonic frequencies. Source: Wikipedia.

As used herein, time series means a sequence of data points representing successive measurements made over an interval of time. Time series analysis comprises methods for analyzing time series data in order to extract characteristics of the data.

As used herein the terminology "processor" includes computer, CPU, microprocessor, main frame, multiprocessor, terminal, minicomputer, laptop, and the like.

As used herein, the terminology algorithm means a procedure or formula for solving a problem; a processing routine or subroutine and the like.

Obviously, many modifications and variations of the present invention are possible in light of the above teachings. It is therefore to be understood that, within the scope of the appended claims, the invention many be practiced otherwise than as specifically described.

The invention claimed is:

1. A system for detection of at least one of human activity and vehicle activity comprising:
at least one sensor adapted to generate a data signal in response to detecting human or vehicular activity,
at least one processor operatively connected to the sensor, the at least one processor operating to perform an analysis of the signal without human intervention in order to recognize and classify the type of activity detected by the sensor;
the at least one processor being configured to denoise the data signal from the sensor; generate an autocorrelation of the data signal; partition the data signal into a predetermined number of overlapping segments to form a time series of data; generate symbols for the overlapping segments; compare the pattern of generated symbols with known patterns of symbols representing human or vehicular activity; determine whether a threshold probability is exceeded which attributes the data signal to human or vehicular activity; analyze the patterns presented in the data signal by transforming the patterns of symbols into states and determining the transitions between states; and classify the activity based upon the transitions between states wherein the at least one sensor comprises a seismic sensor configured to generate a seismic signature and the at least one processor performs a detection analysis using a multi-scale symbolic time series analysis framework for real-time activity recognition from the seismic signature and wherein the at least one processor utilizes a short-length symbolic time-series online classifier (SS-TOC) via Dirichlet Compound-Multinomial model (DCM) which works on symbol sequences generated from seismic time-series and intermediate event class time-series at different time-scales and wherein the classification of the activity utilizes a symbolic sequence modeled as a probabilistic finite state automaton.

2. The system of claim 1 wherein the at least one processor utilizes different window sizes for different time scales that are cascaded in multiple layers for event detection and activity classification.

3. The system of claim 1 wherein the activity is sensed using a seismic sensor to detect ground movement and wherein the signal is divided into a predetermined number of sequential segments having a two second duration with approximately 80% overlap, and wherein the determining of the probability of occurrence of a human event comprises of generating a compound probability distribution, where prior uncertainty is modeled by Dirichlet distribution and posterior uncertainty is modeled by multinomial distribution.

4. The system of claim 1 wherein the classifying of the activity comprises generating a compound probability distribution, and wherein the at least one processor is programmed using the input of known human activity that is modeled using Dirichlet distribution and during subsequent system operation the posterior uncertainty is modeled by multinomial distribution.

5. The system of claim 1 wherein whether or not an activity has occurred is determined using a short length symbolic time series online classifier procedure that estimates probability of activity, and wherein the partial classification portion comprises a division of the probabilities into 40 segments to output a threshold and wherein during classification of the activity symbols are again generated for the segments and the short term symbolic time-series online classifier is used on a first predetermined number of probabilities, then the window is shifted a predetermined number of probabilities to capture the next predetermined number of probabilities; in order to capture variations, and wherein the classification comprises a probabilistic finite state automaton construction.

6. A method for detection and classification of human or vehicular activity using a sensor and at least one processor comprising the following steps not necessarily in the following order:

sensing activity using a seismic sensor; the sensor being operatively connected to at least one processor and providing a seismic data signal extending for a predetermined time frame;

denoising the data signal from the sensor and removal of the mean from the data signal;

generating an autocorrelation of the data signal;

partitioning data signal into a predetermined number of overlapping segments to form a time series of data;

generating symbols for the overlapping segments;

comparing the pattern of generated symbols with known predetermined patterns of symbols representing human or vehicular activity;

determining the probability of whether or not the seismic data signal is attributable to human activity;

determining whether or not the probability determination meets or exceeds a predetermined threshold;

recognizing the data signal as being possibly attributable to an activity when the threshold is met or exceeded;

accumulating additional time frames of data signals repeating the steps of denoising, autocorrelation, partitioning the data signal into a predetermined number of overlapping segments and generating symbols for overlapping segments;

transforming the generated symbols representing the initial and additional time frames into states and determining the transitions between states;

based upon the transitions, determining whether or not a human or vehicular activity has occurred and classifying the activity based upon the transitions between states wherein the activity is sensed using a seismic sensor to detect ground movement and wherein the signal is divided into a predetermined number of sequential segments having a two second duration with approximately 80% overlap, and wherein the determining of the probability of occurrence of a human event comprises of generating a compound probability distribution, where prior uncertainty is modeled by Dirichlet distribution and posterior uncertainty is modeled by multinomial distribution.

7. The method of claim 6 wherein the step of determining whether or not a human or vehicular activity has occurred comprises generating a compound probability distribution, where prior uncertainty is modeled by Dirichlet distribution and posterior uncertainty is modeled by multinomial distribution.

8. The method of claim 6 wherein the data signal is a time series of data and wherein the denoising of the data signal further comprises temporal envelop detection utilizing Hilbert transform of the time series to reduce phase distortions and an autocorrelation of the temporal envelop is obtained with different window sizes for recognizing and classifying the activity.

9. The method of claim 8 wherein the autocorrelation is used as an input to a multi-scale symbolic time series algorithm so as to capture the difference in the periodicity pattern in the autocorrelation between walking and digging.

* * * * *